United States Patent
Yamaguchi

(10) Patent No.: US 7,542,506 B2
(45) Date of Patent: Jun. 2, 2009

(54) DATA RECEIVER AND EQUALIZER ADAPTER

(75) Inventor: Hisakatsu Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 620 days.

(21) Appl. No.: 11/268,457

(22) Filed: Nov. 8, 2005

(65) Prior Publication Data

US 2006/0209945 A1 Sep. 21, 2006

(30) Foreign Application Priority Data

Mar. 18, 2005 (JP) .............................. 2005-080475

(51) Int. Cl.
*H03H 7/30* (2006.01)
(52) U.S. Cl. ...................... 375/229; 375/354
(58) Field of Classification Search ................ 375/229, 375/230, 231, 232, 233, 354, 356
See application file for complete search history.

(56) References Cited

U.S. PATENT DOCUMENTS

| 2004/0225612 A1 | 11/2004 | Shimojima et al. |
| 2005/0259551 A1* | 11/2005 | Kudo et al. ............... 369/59.22 |

FOREIGN PATENT DOCUMENTS

| JP | 07-066739 | 3/1955 |
| JP | 06-178160 A | 6/1994 |
| JP | 09-233007 A | 9/1997 |
| WO | WO 03/005207 A1 | 7/2002 |

* cited by examiner

*Primary Examiner*—Kevin Y Kim
(74) *Attorney, Agent, or Firm*—Arent Fox LLP.

(57) ABSTRACT

A data receiver includes: a plurality of reception circuits each of which receives a data signal through a transmission line, and includes an equalizer having a function of performing waveform shaping of the data signal; and an equalizer adapter which is arranged in correspondence with all or every predetermined number of ones of the plurality of reception circuits, and calculates equalization coefficients for the equalizer in each of the plurality of reception circuits corresponding to the equalizer adapter, where the predetermined number is two or greater.

12 Claims, 18 Drawing Sheets

DATA RECEIVER AND EQUALIZER ADAPTER

CROSS-REFERENCE TO RELATED APPLICATIONS

This application is based upon and claims the benefits of priority from the prior Japanese Patent Application No. 2005-080475, filed on Mar. 18, 2005, the entire contents of which are incorporated herein by reference.

BACKGROUND OF THE INVENTION

1) Field of the Invention

The present invention relates to a data receiver which includes equalizers, receives data signals, and performs waveform shaping of the data signals with the equalizers. In addition, the present invention also relates to an equalizer adapter used in the data receiver for adapting the equalizers.

2) Description of the Related Art

When loss in a transmission line is great in transmission of data signals between LSIs, between elements or circuit blocks in a chip, between circuit boards, or between chassis, the data signals are deformed. Therefore, in such cases, adaptive equalizers are used. The adaptive equalizers detect deformation in data signals received by a receiver, and perform waveform shaping of the data signals into appropriate waveforms.

FIG. 18 is a diagram illustrating an example of a configuration of a data receiver. In FIG. 18, LSI (Large Scale Integration) chips 141 and 142 are indicated. The LSI chip 141 includes transmission circuits 141a to 141d, and the LSI chip 142 includes a data receiver constituted by reception circuits 142a to 142d and equalizer adapters 143a to 143d. The transmission circuits 141a to 141d and the reception circuits 142a to 142d are point-to-point connected through transmission lines, respectively. In addition, in FIG. 18, the dotted frames indicate the boundaries of clock domains. That is, the circuits indicated in each of the dotted frames operate in synchronization with each other.

The reception circuits 142a to 142d respectively receive data signals DT0 to DT3 through the transmission lines, and respectively comprise equalizers (not shown). The equalizer adapters 143a to 143d each receive from the reception circuits 142a to 142d N-bit data, and control the equalization coefficients EQ0 to EQ3 of the equalizers so as to correct deformation of the signals.

That is, the waveforms of the data signals DT0 to DT3 are shaped while controlling the equalization coefficients EQ0 to EQ3 of the equalizers in the reception circuits 142a to 142d by using the equalizer adapters 143a to 143d, respectively. Thereby, for example, the reception circuits 142a to 142d can correctly decide the values represented by the data signals DT0 to DT3 to be 0 or 1.

Further, in a wireless communication system (which is disclosed, for example, in Japanese Unexamined Patent Publication No. 7-66739), equalizers for compensating for intersymbol interference occurring in a digital communication system and deterioration caused by noise are arranged in two stages preceding reception circuits.

However, when equalizer adapters are respectively arranged in correspondence with the reception circuits, the size of the circuitry and power consumption increase.

SUMMARY OF THE INVENTION

The present invention is made in view of the above problems, and the first object of the present invention is to provide a data receiver including a plurality of equalizers and having reduced circuit size and reduced power consumption, and the second object of the present invention is to provide an equalizer adapter for dynamically adapting the plurality of equalizers in the data receiver.

In order to accomplish the above object, according to the present invention, a data receiver in which waveforms of data signals are shaped is provided. The data receiver comprises: a plurality of reception circuits each of which receives a data signal through a transmission line, and includes an equalizer having a function of waveform shaping of the data signal; and an equalizer adapter which is arranged in correspondence with all or every predetermined number of ones of the plurality of reception circuits, and calculates equalization coefficients for the equalizer in each of the plurality of reception circuits corresponding to the equalizer adapter, where the predetermined number is two or greater.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

Preferred embodiments of the present invention will be explained below with reference to the accompanying drawings, wherein like reference numbers refer to like elements throughout.

Basic Construction of the Present Invention

Figure 1:
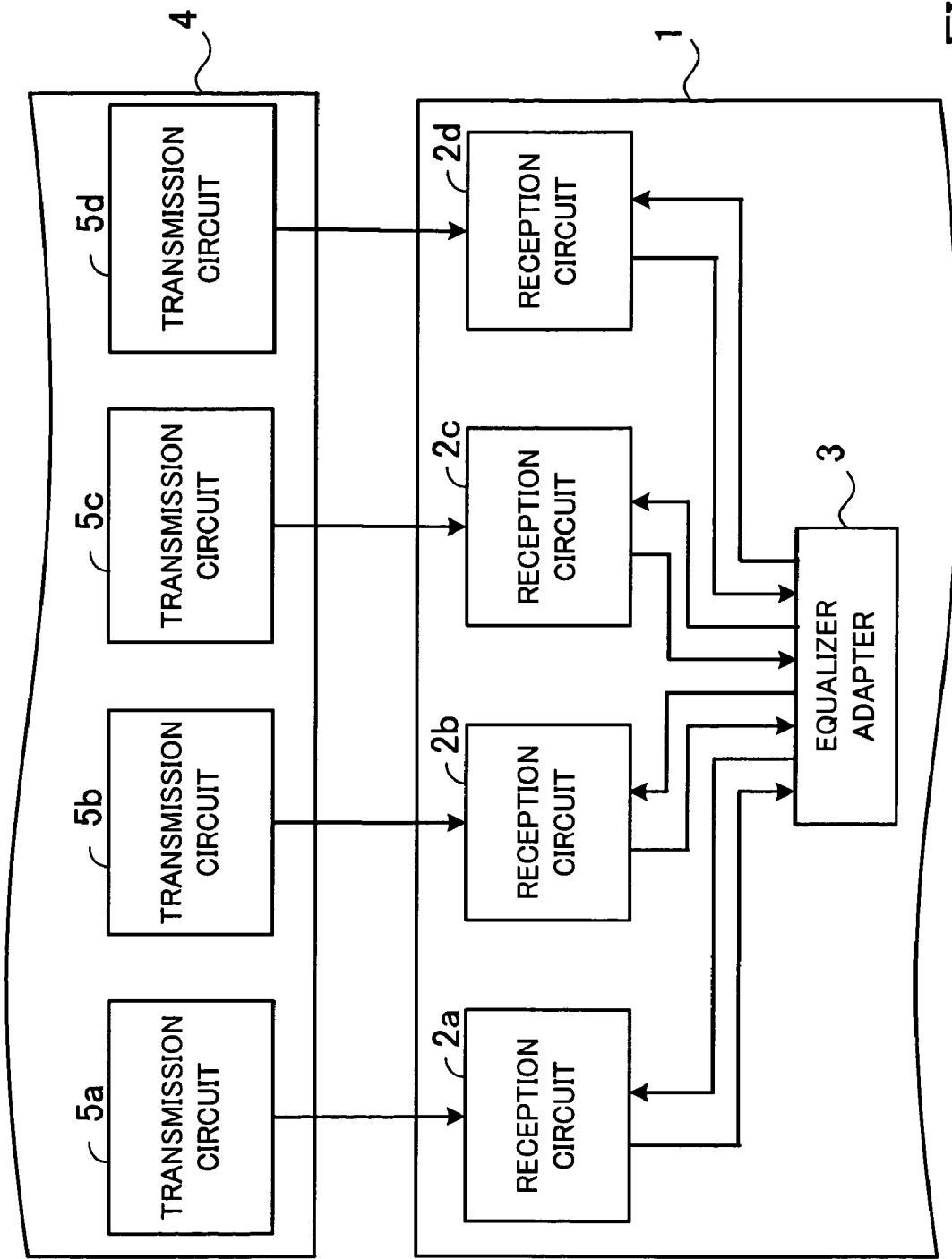
FIG. 1 is a diagram illustrating an outline of an exemplary construction of a data receiver according to the present invention.

FIG. 1 is a diagram illustrating an outline of an exemplary construction of a data receiver according to the present invention. The example illustrated in FIG. 1 includes an LSI chip 1 on which the data receiver according to the present invention is formed, and an LSI chip 4 on which transmission circuits 5a to 5d are formed. The data receiver in the LSI chip 1 comprises reception circuits 2a to 2d and an equalizer adapter 3. The reception circuits 2a to 2d in the LSI chip 1 and the transmission circuits 5a to 5d in the LSI chip 4 are point-to-point connected through transmission lines, respectively.

The reception circuits 2a to 2d receive data signals from the transmission circuits 5a to 5d through the transmission lines, respectively. Each of the reception circuits 2a to 2d comprises an equalizer which performs waveform shaping of the data signal which the reception circuit receives.

An equalizer adapter (e.g., the equalizer adapter 3 illustrated in FIG. 1) is provided for all or every predetermined number of ones of the reception circuits 2a to 2d, where the predetermined number is two or greater. Each equalizer adapter calculates equalization coefficients for waveform shaping by the equalizers in the corresponding ones of the reception circuits 2a to 2d, and outputs the calculated equalization coefficients to the corresponding ones of the reception circuits 2a to 2d.

In the example illustrated in FIG. 1, the equalizer adapter 3 is provided for all the reception circuits 2a to 2d. Alternatively, it is possible to provide an equalizer adapter for every predetermined number of ones of the reception circuits 2a to 2d, where the predetermined number is two or greater. For example, an equalizer adapter may be provided for the reception circuits 2a and 2b, and another equalizer adapter may be provided for the reception circuits 2c and 2d.

Since an equalizer adapter is provided for all or every predetermined number of ones of the reception circuits 2a to 2d for calculating the equalization coefficients for the equalizers in the corresponding ones of the reception circuits 2a to 2d, and the predetermined number is two or greater, it is possible to reduce the size of the circuitry and the power consumption.

First Embodiment

Hereinbelow, the first embodiment of the present invention is explained in detail with reference to FIGS. 2 to 10.

Figure 2:
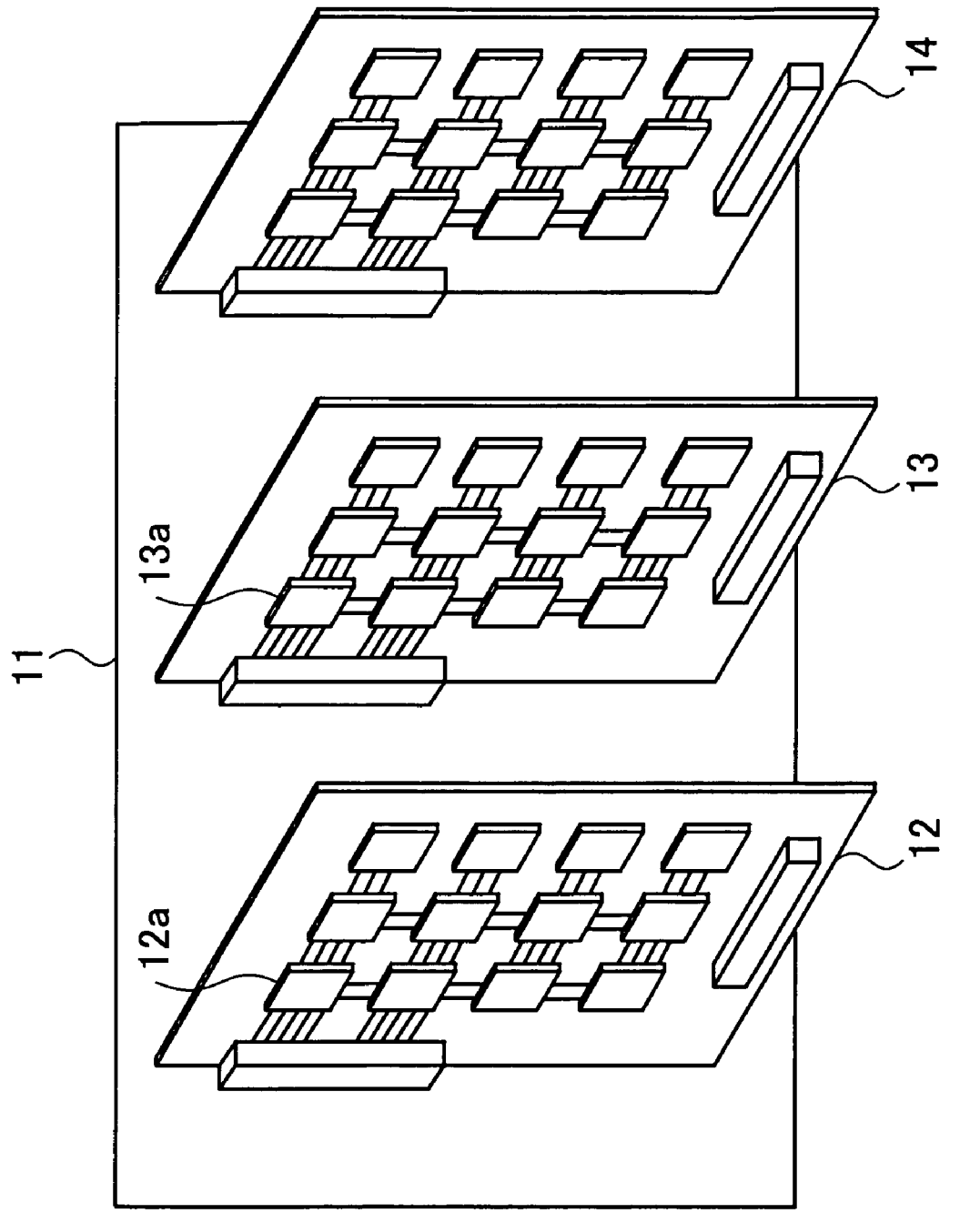
FIG. 2 is a diagram illustrating an example of a system in which a data receiver according to a first embodiment of the present invention is used.

FIG. 2 is a diagram illustrating a communication device as an example of a system in which a data receiver according to a first embodiment of the present invention is used. The communication device of FIG. 2 performs predetermined operations including conversion from optical signals into electric signals and conversion from electric signals into optical signals.

As illustrated in FIG. 2, the communication device comprises a backboard 11 and circuit boards 12 to 14. The circuit boards 12 to 14 are mounted on the backboard 11 so that circuit boards 12 to 14 can communicate with each other through the backboard 11.

An LSI chip 12a on which a plurality of transmission circuits are formed is mounted on the circuit board 12, and an LSI chip 13a on which a plurality of reception circuits and an equalizer adapter are formed is mounted on the circuit board 13. The transmission circuits on the LSI chip 12a and the reception circuits on the LSI chip 13a are point-to-point connected through transmission lines arranged in the backboard 11.

The reception circuits on the LSI chip 13a receive data signals from the transmission circuits on the LSI chip 12a. The equalizer adapter on the LSI chip 13a receives from the reception circuits the data signals the waveforms of which are to be shaped, and controls the equalization coefficients of the equalizers.

As described above, the data receiver according to the first embodiment is arranged in such a manner that a single equalizer adapter can control the equalizers in the reception circuits, and the reception circuits can correctly decide the data represented by the data signals. Although only one equalizer adapter is provided for all the reception circuits in the above construction, alternatively, it is possible to provide an equalizer adapter for every predetermined number of ones of the reception circuits, where the predetermined number is two or greater.

Next, the operations of waveform shaping performed by using the equalizer adapter are explained below.

Figure 3:
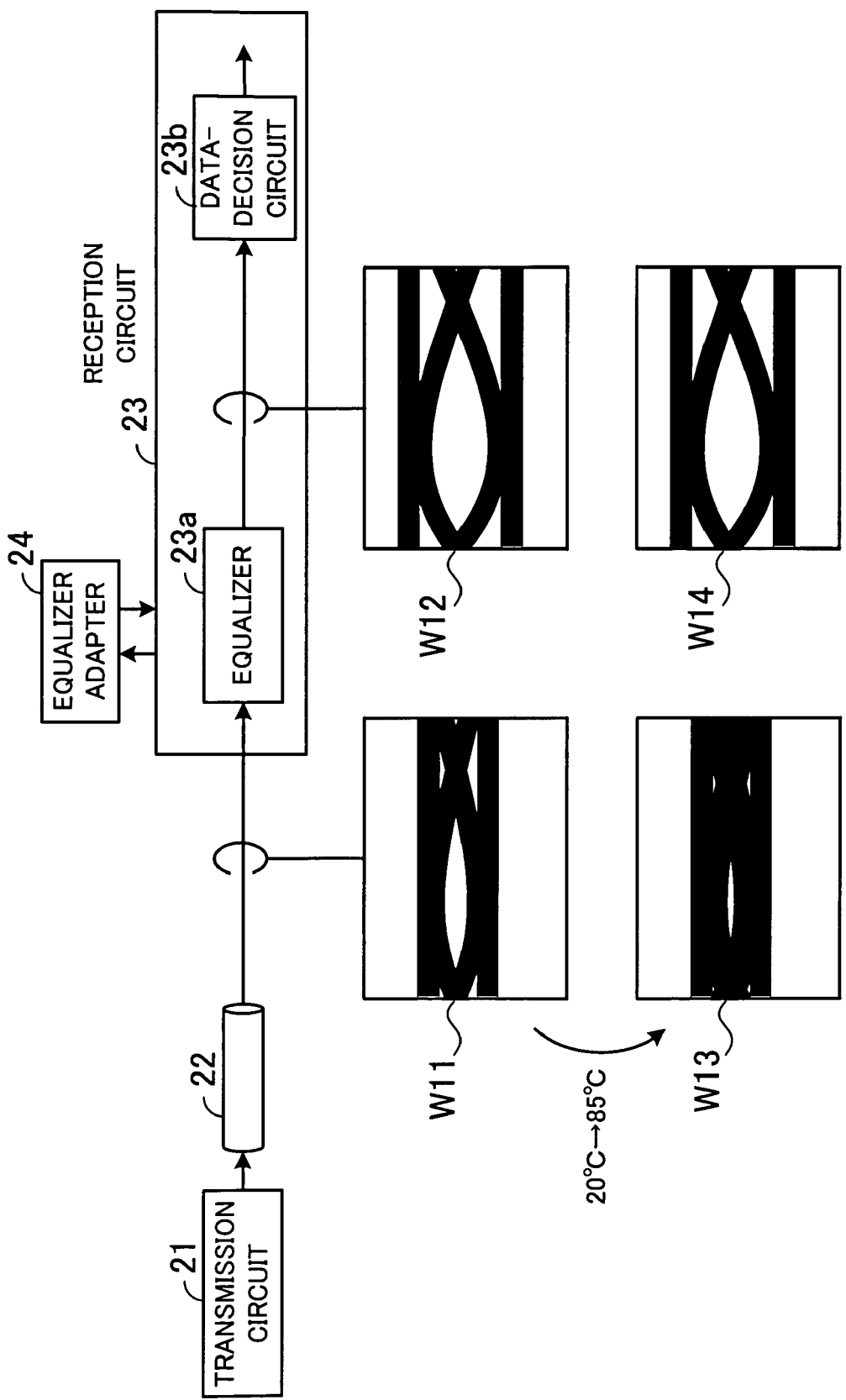
FIG. 3 is a diagram for explaining operations of waveform shaping realized by using an equalizer adapter.

FIG. 3 is a diagram for explaining operations of waveform shaping performed by using an equalizer adapter. In FIG. 3, a transmission circuit 21, a transmission line 22, a reception circuit 23 (which comprises an equalizer 23a and a data-decision circuit 23b), and an equalizer adapter 24 are indicated. The transmission circuit 21 transmits data signals through the transmission line 22, the reception circuit 23 receives the data signals, and the equalizer adapter 24 controls the waveform shaping in the reception circuit 23. The data-decision circuit 23b in the reception circuit 23 decides the values represented by the received data signals to be 0 or 1 (or −1 or 1). When the system of FIG. 3 is compared with the communication device of FIG. 2, the transmission circuit 21 corresponds to one of the transmission circuits on the LSI chip 12a, the reception circuit 23 corresponds to one of the reception circuits on the LSI chip 13a, the transmission line 22 corresponds to one of the transmission lines in the backboard 11, and the equalizer adapter 24 corresponds to the equalizer adapter on the LSI chip 13a.

In addition, in FIG. 3, the data signals outputted through the transmission line 22 at the temperature of 20° C. exhibit the eye pattern W11, and the data signals outputted from the equalizer 23a in the reception circuit 23 at the temperature of 20° C. exhibit the eye pattern W12. The eye patterns W11 and W12 show that the amplitudes of the data signals reduced after the transmission through the transmission line 22 are recovered by the equalizer 23a and the equalizer adapter 24 at the temperature of 20° C.

Further, in FIG. 3, the data signals outputted through the transmission line 22 at the temperature of 85° C. exhibit the eye pattern W13, and the data signals outputted from the equalizer 23a in the reception circuit 23 at the temperature of 85° C. exhibit the eye pattern W14. The eye patterns W13 and W14 show that the amplitudes of the data signals reduced after the transmission through the transmission line 22 are recovered by the equalizer 23a and the equalizer adapter 24 at the temperature of 85° C. Comparison of the eye patterns W11 and W13 shows that the amplitudes of the data signals are further reduced by the transmission when the temperature is higher. However, comparison of the eye patterns W12 and W14 shows that the amplitudes of the data signals reduced by the transmission at the temperature of 85° C. can be recovered similarly to the recovery at the temperature of 20° C.

As indicated above, even when the data signals are deformed by the transmission through the transmission line 22, the waveforms of the data signals can be shaped by the equalizer 23a and the equalizer adapter 24. Therefore, the data-decision circuit 23b in the reception circuit 23 can correctly decide the values represented by the data signals.

Next, a circuit configuration of the data receiver according to the first embodiment is explained below.

Figure 4:
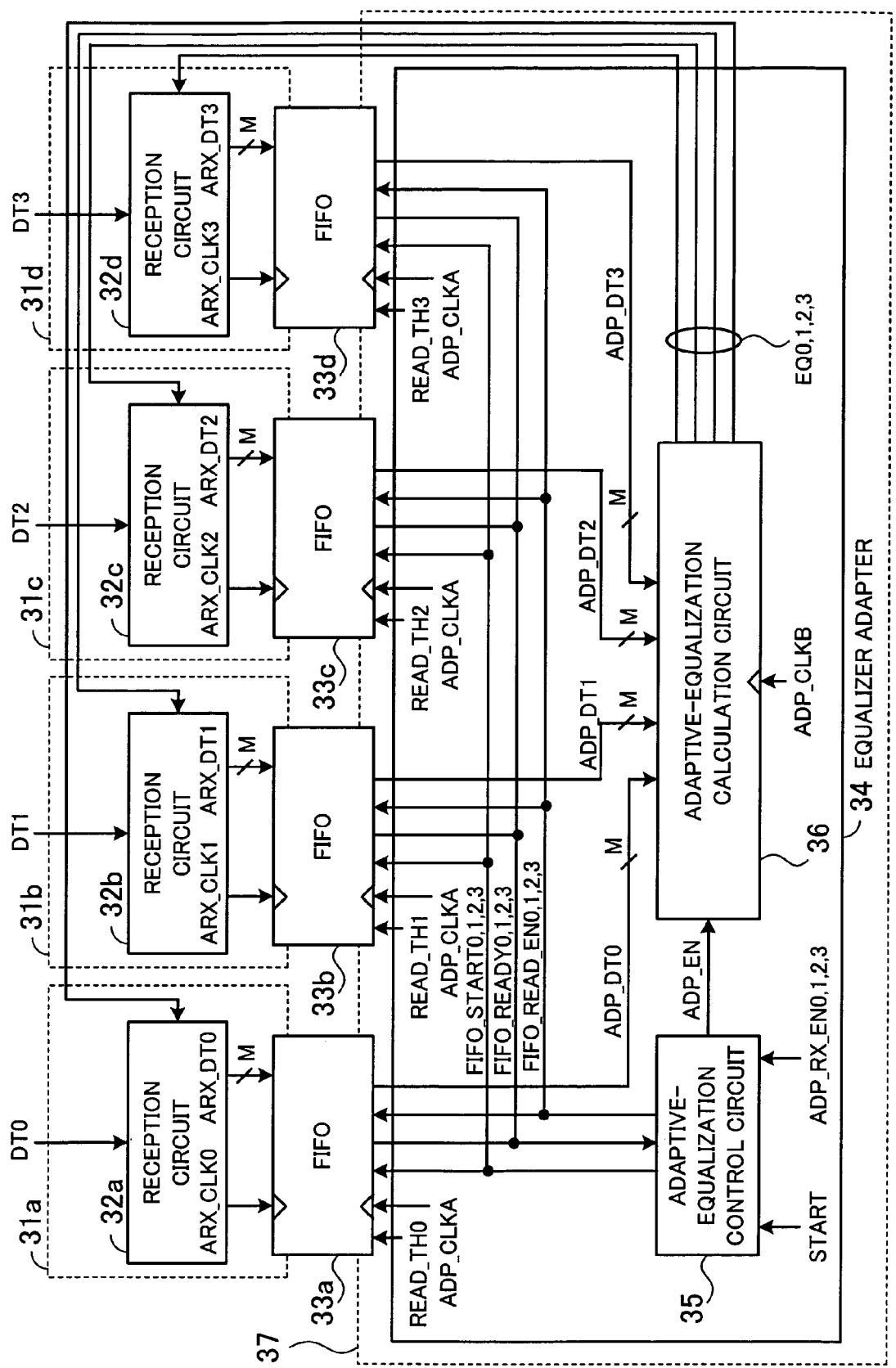
FIG. 4 is a diagram illustrating a circuit configuration of the data receiver according to the first embodiment.

FIG. 4 is a diagram illustrating a circuit configuration of the data receiver according to the first embodiment. The data receiver of FIG. 4 comprises reception circuits 32a to 32d, FIFO circuits 33a to 33d, and an equalizer adapter 34. The FIFO circuits are first-in first-out type memories. In addition, in FIG. 4, the dotted frames 31a to 31d and 37 indicate the boundaries of clock domains. That is, the circuits indicated in each of the dotted frames 31a to 31d and 37 operate asynchronously with the circuits in the other dotted frames. When the data receiver of FIG. 4 is compared with the communication device of FIG. 2, the reception circuits 32a to 32d correspond to the reception circuits on the LSI chip 13a, and the equalizer adapter 34 corresponds to the equalizer adapter on the LSI chip 13a. In addition, in the case where the data receiver of FIG. 4 is realized in the construction of FIG. 2, the reception circuits 32a to 32d corresponding to the reception circuits on the LSI chip 13a are point-to-point connected to the transmission circuits on the LSI chip 12a through the transmission lines in the backboard 11.

The reception circuits 32a to 32d receive data signals DT0 to DT3 through transmission lines, respectively. The equalizer adapter 34 comprises an adaptive-equalization control circuit 35 and an adaptive-equalization calculation circuit 36.

The reception circuits 32a to 32d comprise equalizers (not shown), respectively. The equalizer adapter 34 receives predetermined data from the reception circuits 32a to 32d, calculates the equalization coefficients for the equalizers on the basis of the predetermined data so that the equalizers can appropriately perform waveform shaping of the data signals DT0 to DT3. Then, the equalizer adapter 34 supplies the calculated equalization coefficients to the corresponding reception circuits 32a to 32d.

Since the single equalizer adapter 34 is provided for the reception circuits 32a to 32d, and the reception circuits 32a to 32d independently receive and process the data signals DT0 to DT3, the operation timings of the reception circuits 32a to 32d are different. Although the frequencies of the operation clock signals of the reception circuits 32a to 32d are identical, the phases of the operation clock signals are different. Therefore, in order to enable transfer of data between the single equalizer adapter 34 and all the reception circuits 32a to 32d, it is necessary to synchronize the data with the operation timings of the equalizer adapter 34. Thus, according to the first embodiment, the FIFO circuits 33a to 33d are provided for the reception circuits 32a to 32d, respectively. When the reception circuits 32a to 32d write data in the FIFO circuits 33a to 33d, and the equalizer adapter 34 reads the data from the FIFO circuits 33a to 33d, the data can be transferred from the reception circuits 32a to 32d to the equalizer adapter 34.

The reception circuits 32a to 32d output clock signals ARX_CLK0 to ARX_CLK3 to the FIFO circuits 33a to 33d. Since the reception circuits 32a to 32d operate independently, the phases of the clock signals ARX_CLK0 to ARX_CLK3 are different although the frequencies of the clock signals ARX_CLK0 to ARX_CLK3 are identical. In addition, the reception circuits 32a to 32d output to the FIFO circuits 33a to 33d data elements of M-bit data sequences ARX_DT0 to ARX_DT3 needed for calculation of equalization coefficients for the equalizers, in synchronization with the clock signals ARX_CLK0 to ARX_CLK3, respectively. Further, the reception circuits 32a to 32d receive equalization coefficient sets EQ0 to EQ3 from the adaptive-equalization calculation circuit 36. The equalizers in the reception circuits 32a to 32d perform waveform shaping of the data signals DT0 to DT3 on the basis of the equalization coefficient sets EQ0 to EQ3, respectively, so that the data represented by the data signals DT0 to DT3 can be correctly decided.

A clock signal ADP_CLKA, which is generated by the equalizer adapter 34, is supplied to the FIFO circuits 33a to 33d. The FIFO circuits 33a to 33d respectively output in succession the data elements of the M-bit data sequences ARX_DT0 to ARX_DT3 which have been written by the reception circuits 32a to 32d and stored in the FIFO circuits 33a to 33d, as data elements of M-bit data sequences ADP_DT0 to ADP DT3 (for calculation of the equalization coefficients) to the adaptive-equalization calculation circuit 36 in synchronization with the clock signal ADP_CLKA. In addition, start signals FIFO_START0 to FIFO_START3 are inputted into the FIFO circuits 33a to 33d, respectively. When the start signals FIFO_START0 to FIFO_START3 are inputted into the FIFO circuits 33a to 33d, the FIFO circuits 33a to 33d start their operation. Further, threshold signals READ_TH0 to READ_TH3, which respectively indicate threshold numbers of data elements of the data sequences ARX_DT0 to ARX_DT3, are inputted into the FIFO circuits 33a to 33d, respectively. In each of the FIFO circuits 33a to 33d, when the number of data elements of one of the data sequences ARX_DT0 to ARX_DT3 which have been written in the FIFO circuit reaches the threshold number of data elements of the one of the data sequences ARX_DT0 to ARX_DT3 which is indicated by one of the threshold signals READ_TH0 to READ_TH3 corresponding to the FIFO circuit, the FIFO circuit outputs to the adaptive-equalization control circuit 35 one of ready signals FIFO_READY0 to FIFO_READY3 corresponding to the FIFO circuit. Each of the ready signals FIFO_READY0 to FIFO_READY3 indicates that an operation of reading out data from one of the FIFO circuits 33a to 33d corresponding to the ready signal is possible. Furthermore, enable signals FIFO_READ_EN0 to FIFO_READ_EN3 are inputted into the FIFO circuits 33a to 33d, respectively. In each of the FIFO circuits 33a to 33d, when one of the enable signals FIFO_READ_EN0 to FIFO_READ_EN3 corresponding to the FIFO circuit is inputted into the FIFO circuit, the FIFO circuit outputs, to the adaptive-equalization calculation circuit 36, data elements of one of the data sequences ARX_DT0 to ARX_DT3 (as data elements of one of the data sequences ADP_DT0 to ADP_DT3 for calculation of the equalization coefficients) which have been written in the FIFO circuit, in the order in which the data elements have been written in the FIFO circuit. The threshold signals READ_TH0 to READ_TH3 are outputted from, for example, a control device such as a central processing unit (CPU).

A start signal START and enable signals ADP_RX_EN0 to ADP_RX_EN3 are inputted into the adaptive-equalization control circuit 35 in the equalizer adapter 34. When the start signal START is inputted into the adaptive-equalization control circuit 35, the adaptive-equalization control circuit 35 outputs one or more of the start signals FIFO_START0 to FIFO_START3 to one or more of the FIFO circuits 33a to 33d which should be activated, according to the enable signals ADP_RX_EN0 to ADP_RX_EN3, respectively. Since it is unnecessary to activate one or more of the FIFO circuits 33a to 33d in some applications, the FIFO circuits 33a to 33d can be selectively activated in accordance with the FIFO_START0 to FIFO_START3. In addition, the ready signals FIFO_READY0 to FIFO_READY3 are inputted from the FIFO circuits 33a to 33d into the adaptive-equalization control circuit 35. When the adaptive-equalization control circuit 35 receives each of the ready signals FIFO_READY0 to FIFO_READY3 from the FIFO circuits 33a to 33d, the adaptive-equalization control circuit 35 outputs one of the enable signals FIFO_READ_EN0 to FIFO_READ_EN3 corresponding to the received ready signal, to one of the FIFO circuits 33a to 33d which outputs the received ready signal. Further, when the start signal START is inputted into the adaptive-equalization control circuit 35, the adaptive-equalization control circuit 35 outputs an enable signal ADP_EN to the adaptive-equalization calculation circuit 36 for activating the adaptive-equalization calculation circuit 36. The start signal START and the enable signals ADP_RX_EN0 to ADP_RX_EN3 are outputted from, for example, a control device such as a central processing unit (CPU).

The adaptive-equalization calculation circuit 36 is activated when the adaptive-equalization calculation circuit 36 receives the enable signal ADP_EN from the adaptive-equalization control circuit 35. In addition, a clock signal ADP_CLKB is supplied to the adaptive-equalization calculation circuit 36, which operates in synchronization with the clock signal ADP_CLKB. The frequency of the clock signal ADP_CLKB is an integer multiple of the frequency of the clock signals ARX_CLK0 to ARX_CLK3, where the integer is equal to the number of the reception circuits. Since the number of the reception circuits 32a to 32d is four in the example of FIG. 4, the frequency of the clock signal ADP_CLKB is four times the frequency of the clock signals ARX_CLK0 to ARX_CLK3.

The adaptive-equalization calculation circuit 36 reads out and receives data elements of the data sequences ADP_DT0 to ADP_DT3 from the FIFO circuits 33a to 33d, and calculates the equalization coefficient sets EQ0 to EQ3 on the basis of the data elements of the data sequences ADP_DT0 to ADP_DT3 so that the equalizers in the reception circuits 32a to 32d can perform waveform shaping of the data signals DT0 to DT3. The adaptive-equalization calculation circuit 36 supplies the calculated equalization coefficient sets EQ0 to EQ3 to the reception circuits 32a to 32d.

Hereinbelow, an example of the reception circuit 32a in the data receiver of FIG. 4 is explained in detail.

Figure 5:
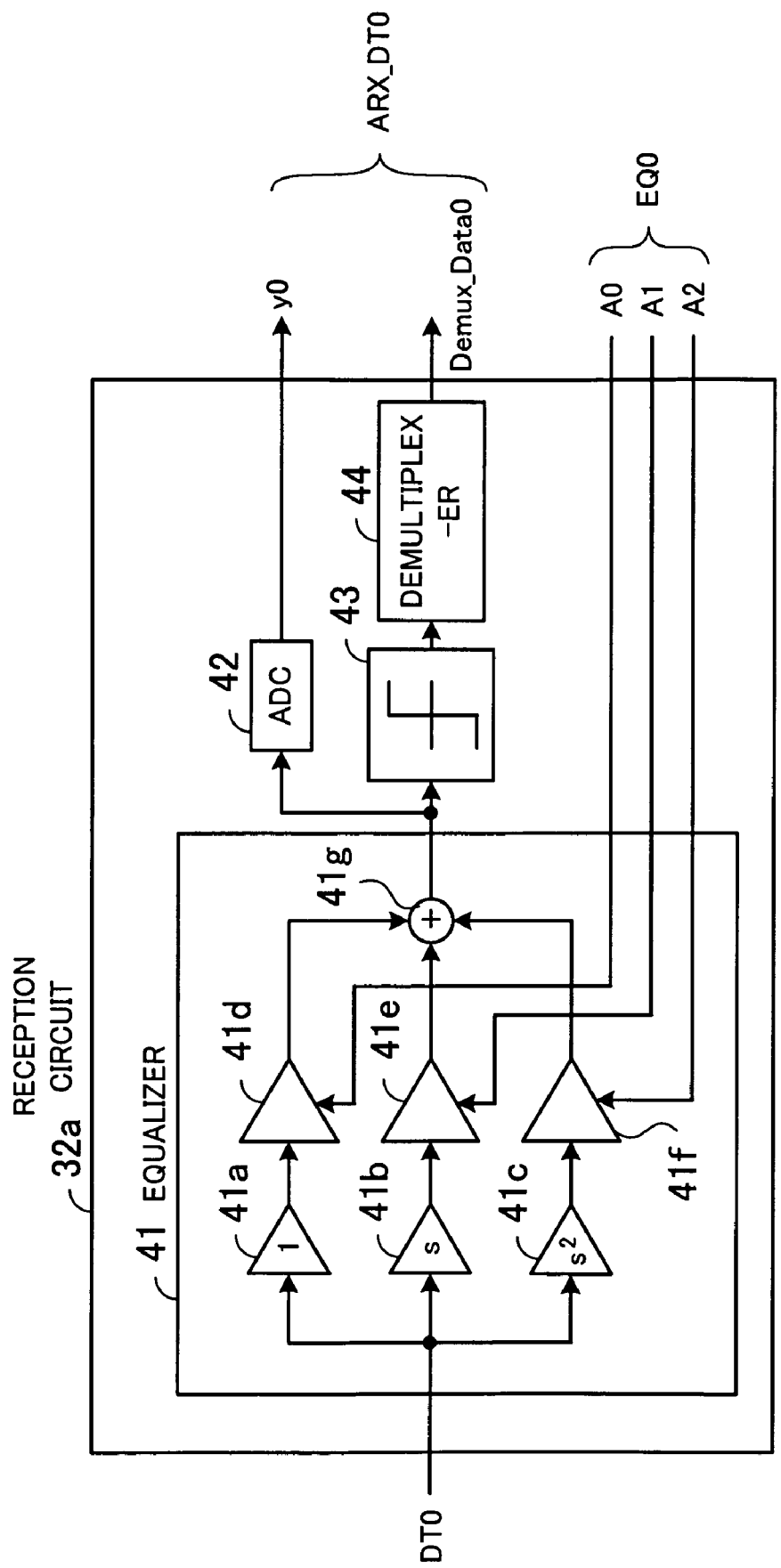
FIG. 5 is a diagram illustrating a circuit configuration of a reception circuit in the data receiver of FIG. 4.

FIG. 5 is a diagram illustrating a circuit configuration of the reception circuit 32a. As illustrated in FIG. 5, the reception circuit 32a comprises an equalizer 41, an analog-to-digital converter (ADC) 42, a data-decision circuit 43, and a demultiplexer 44. The equalizer 41 comprises a buffer 41a, a first differentiator 41b, a second differentiator 41c, variable-gain amplifiers 41d to 41f, and an adder 41g.

The first differentiator 41b enhances variations in signals by differentiating the signals once, and the second differentiator 41c further enhances the variations in the signals by differentiating the signals twice.

The data signal DT0 is inputted from a transmission line into the buffer 41a, the first differentiator 41b, and the second differentiator 41c, so that variations in the data signal DT0 are enhanced by the first differentiator 41b and the second differentiator 41c. Then, the outputs of the buffer 41a, the first differentiator 41b, and the second differentiator 41c are inputted into the variable-gain amplifiers 41d to 41f, respectively. In addition, the equalization coefficients A0 to A2 constituting the equalization coefficient set EQ0, which are outputted from the adaptive-equalization calculation circuit 36 illustrated in FIG. 4, are supplied to the variable-gain amplifiers 41d to 41f, respectively.

The variable-gain amplifiers 41d to 41f control the degrees of enhancement of the variations in the data signals outputted from the buffer 41a, the first differentiator 41b, and the second differentiator 41c by controlling the variable gains of the variable-gain amplifiers 41d to 41f according to the equalization coefficients A0 to A2, and the outputs of the variable-gain amplifiers 41d to 41f are supplied to the adder 41g. The adder 41g adds the outputs of the variable-gain amplifiers 41d to 41f, so that the amplitude of the data signal DT0 is recovered. Thus, the equalizer 41 can perform waveform shaping of the data signal DT0 according to the equalization coefficients A0 to A2.

The ADC 42 performs analog-to-digital conversion of the waveform-shaped data signal outputted from the equalizer 41. The data-decision circuit 43 decides the values represented by the waveform-shaped data signal to be 1 or −1 (or 1 or 0). The demultiplexer 44 demultiplexes (i.e., performs serial-to-parallel conversion of) the signal outputted from the data-decision circuit 43. The data y0 outputted from the ADC 42 and the parallel data Demux_Data0 outputted from the demultiplexer 44 constitute the aforementioned data sequence ARX_DT0 for calculation of the equalization coefficients.

Further, each of the reception circuits 32b to 32d has a similar construction and functions to those of the reception circuit 32a.

Next, the unit pulse response of the equalizer 41 is explained below.

Figure 6:
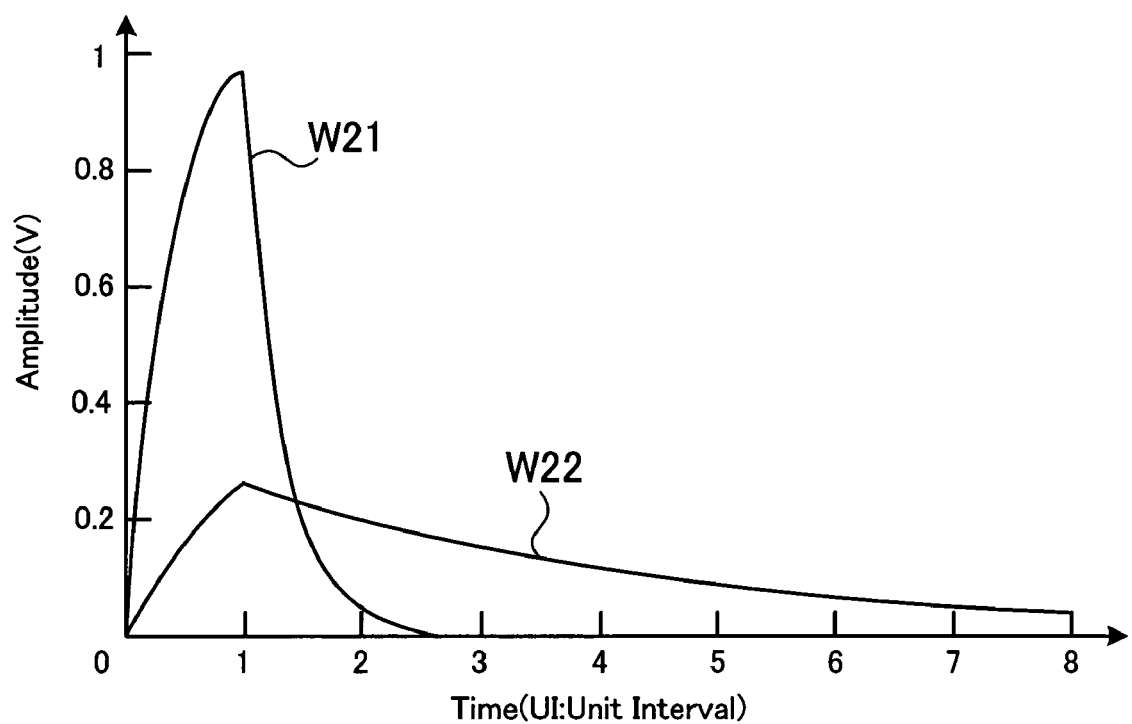
FIG. 6 is a diagram illustrating unit pulse responses of an equalizer and a transmission line.

FIG. 6 is a diagram illustrating unit pulse responses of equalizer 41 and the transmission line. In FIG. 6, the waveform W21 indicates the unit pulse response of the equalizer 41, and the waveform W22 indicates the unit pulse response of the transmission line.

The waveform W22 in FIG. 6 shows that the unit pulse response of the transmission line does not rapidly rise. Therefore, the amount of intersymbol-interference (ISI) components is large. On the other hand, the waveform W21 in FIG. 6 shows that the unit pulse response of the equalizer 41 rapidly rises. Therefore, the amount of intersymbol-interference (ISI) components is small. That is, the waveform of the data signal is shaped by the equalizer 41.

Hereinbelow, an example of the adaptive-equalization calculation circuit 36 in the data receiver of FIG. 4 is explained in detail.

Figure 7:
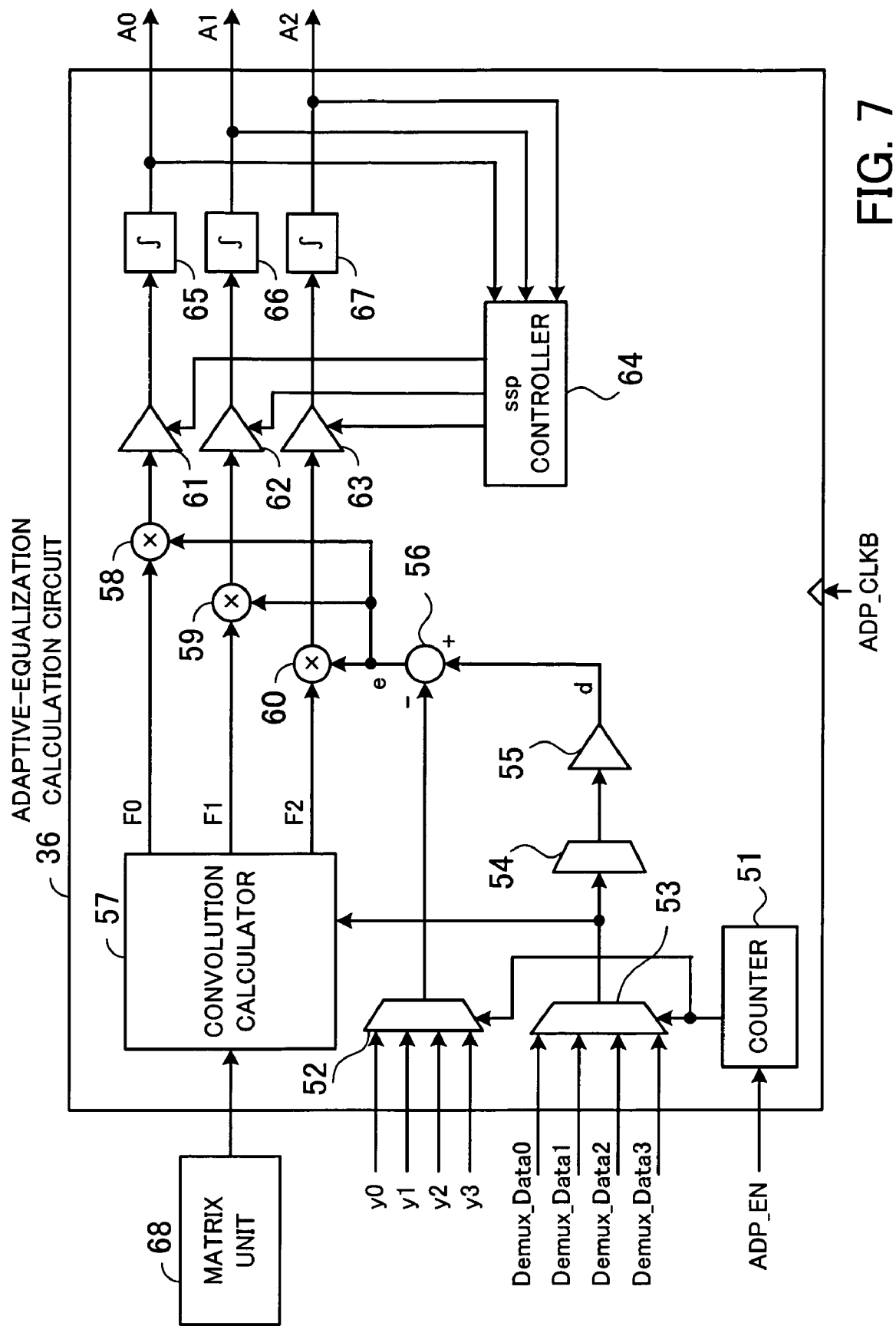
FIG. 7 is a diagram illustrating a circuit configuration of an adaptive-equalization calculation circuit in the data receiver according to the first embodiment.

FIG. 7 is a diagram illustrating a circuit configuration of the adaptive-equalization calculation circuit 36 in the data receiver of FIG. 4. The adaptive-equalization calculation circuit 36 illustrated in FIG. 7 comprises a counter 51, selectors 52 to 54, an amplifier 55, a subtractor 56, a convolution calculator 57, multipliers 58 to 60, variable-gain amplifiers 61 to 63, an ssp (step-size parameter) controller 64, and integrators 65 to 67. In addition, a matrix unit 68 is connected to the convolution calculator 57. The selector 54, the amplifier 55, the subtractor 56, the convolution calculator 57, the multipliers 58 to 60, the variable-gain amplifiers 61 to 63, the integrators 65 to 67, and the matrix unit 68 respectively have similar constructions to the corresponding elements in the conventional equalizer adapters.

An enable signal ADP_EN outputted from the adaptive-equalization control circuit 35 illustrated in FIG. 4 is inputted into the counter 51. When the enable signal ADP_EN is inputted into the counter 51, the counter 51 starts counting in synchronization with the clock signal ADP_CLKB, and outputs the counted value to the selectors 52 and 53.

The aforementioned data y0 outputted from the reception circuit 32a illustrated in FIG. 5 is inputted into the selector 52. In addition, data y1 to y3 are inputted into the selector 52, where the data y1 to y3 are respectively outputted from the reception circuits 32b to 32d in a similar manner to the manner in which the data y0 is outputted from the reception circuit 32a. The selector 52 selects one of the data y0 to y3 according to the counted value outputted from the counter 51, and the output of the selector 52 is supplied to the subtractor 56.

Further, the aforementioned data Demux_Data0 outputted from the reception circuit 32a illustrated in FIG. 5 is inputted into the selector 53. In addition, data Demux_Data1 to Demux_Data3 are inputted into the selector 53, where the data Demux_Data1 to Demux_Data3 are respectively outputted from the reception circuits 32b to 32d in a similar manner to the manner in which the data Demux_Data0 is outputted from the reception circuit 32a. The selector 53 selects one of the data Demux_Data0 to Demux_Data3 according to the counted value outputted from the counter 51. As mentioned before, the data y0 and the data Demux_Data0 constitute the aforementioned data sequence ADP_DT0 (for calculation of the equalization coefficients). Similarly, the data y1 and the data Demux_Data1 constitute the aforementioned data sequence ADP_DT1, the data y2 and the data Demux_Data2 constitute the aforementioned data sequence ADP_DT2, and the data y3 and the data Demux_Data3 constitute the aforementioned data sequence ADP_DT3.

As described above, the data y0 to y3 are inputted into the selector 52, the data Demux_Data0 to Demux_Data3 are inputted into the selector 53, and the data y0 to y3 and Demux_Data0 to Demux_Data3 are outputted from the reception circuits 32a to 32d. Therefore, the counter 51 is required to increase the count so that the data y0 to y3 are selected by and outputted from the selector 52 in turn, and the data Demux_Data0 to Demux_Data3 are selected by and outputted from the selector 53 in turn. In the example of FIG. 7, the counter 51 is 2-bit counter, and repeatedly outputs to the selectors 52 and 53 the values of 0 to 3 in turn. As mentioned before, the frequency of the clock signal ADP_CLKB is four times the frequency of the clock signals ARX_CLK0 to ARX_CLK3. Therefore, during each cycle of the clock signals ARX_CLK0 to ARX_CLK3, the counter 52 selects and outputs the data y0 to y3 in turn, and the selector 53 selects and outputs the data Demux_Data0 to Demux_Data3 in turn.

The selector 54 selects one bit of the one of the data Demux_Data0 to Demux_Data3 outputted from the selector 53, and outputs data representing the selected bit to the amplifier 55. The amplifier 55 amplifies the data outputted from the selector 54 by a predetermined factor, and outputs the amplified data d to the subtractor 56.

The data y0 to y3 indicate the amplitudes of the data signals inputted into the data-decision circuits in the reception circuits 32a to 32d, respectively, and the data d outputted from the amplifier 55 indicates an expected value of the data signal inputted into the data-decision circuit in one of the reception circuits 32a to 32d corresponding to the one of the data Demux_Data0 to Demux_Data3 outputted from the selector 53. Therefore, the subtractor 56 obtains a difference between the amplitude of the data signal inputted into the data-decision circuit in each of the reception circuits 32a to 32d and an expected value of the amplitude of the data signal inputted into the data-decision circuit, and outputs the difference as an amplitude error e to the multipliers 58 to 60.

The matrix unit 68 stores data of unit pulse matrixes in which characteristics of the transmission lines and characteristics of the buffer 41a, the first differentiator 41b, and the second differentiator 41c (constituting the equalizer) in each of the reception circuits 32a to 32d are reflected. Although the matrix unit 68 is arranged outside the adaptive-equalization calculation circuit 36 in FIG. 7, alternatively, the matrix unit 68 may be arranged in the adaptive-equalization calculation circuit 36.

The convolution calculator 57 calculates convolution of the data Demux_Data0 to Demux_Data3 outputted from the selector 53 and the unit pulse matrixes stored in the matrix unit 68, and outputs input amplitudes F0 to F2, which are expected values of the amplitudes of the signals inputted into the variable-gain amplifiers 41d to 41f in each of the reception circuits 32a to 32d.

The multipliers 58 to 60 calculate values of correlation between the input amplitudes F0 to F2 outputted from the convolution calculator 57 and the amplitude error e outputted from the subtractor 56. The gains of the variable-gain amplifiers 41d to 41f in the equalizers in the reception circuits 32a to 32d are determined on the basis of the values of correlation calculated by the multipliers 58 to 60. Since the input amplitudes F0 to F2 are expected values of the amplitudes of the signals inputted into the variable-gain amplifiers 41d to 41f, alternatively, it is possible to convert the amplitudes of the signals inputted into variable-gain amplifiers 41d to 41f into digital form, and directly input digitized amplitudes into the multipliers 58 to 60.

The variable-gain amplifiers 61 to 63 amplify the above values of correlation outputted from the multipliers 58 to 60, with variable gains, and output the amplified values to the integrators 65 to 67. The gains of the variable-gain amplifiers 61 to 63 (i.e., ssp's) are controlled by the ssp controller 64. The variable gains of the variable-gain amplifiers 61 to 63 determine the convergence time constant of the adaptive equalization loop, which is a step-size parameter (ssp). The integrators 65 to 67 accumulate the signals outputted from the variable-gain amplifiers 61 to 63, and output the equalization coefficients A0 to A2.

The influence of local errors produced by noise occurring in the reception circuits 32a to 32d or other can be reduced when the signals outputted from the variable-gain amplifiers 61 to 63 are averaged under the control of the ssp controller 64. Since the number of the reception circuits 32a to 32d is four in this example, for example, the ssp controller 64 can reduce each of the gains of the variable-gain amplifiers 61 to 63 to one-fourth, and the integrators 65 to 67 can accumulate four successive values of each of the signals outputted from the variable-gain amplifiers 61 to 63. Thus, it is possible to average the equalization coefficients to be supplied to each of the reception circuits 32a to 32d.

Alternatively, it is possible to supply the equalization coefficients to the reception circuits 32a to 32d without averaging the equalization coefficients. In this case, the ssp controller 64 is not required to reduce the gains of the variable-gain amplifiers 61 to 63 to one-fourth, and the integrators 65 to 67 are required to accumulate successive values of the signals, and are required to output the equalization coefficients A0 to A2. In this case, the convergence rates of the equalization coefficients are four times greater than the convergence rates in the case where the equalization coefficients are averaged.

Hereinbelow, an example of the adaptive-equalization control circuit 35 is explained in detail.

Figure 8:
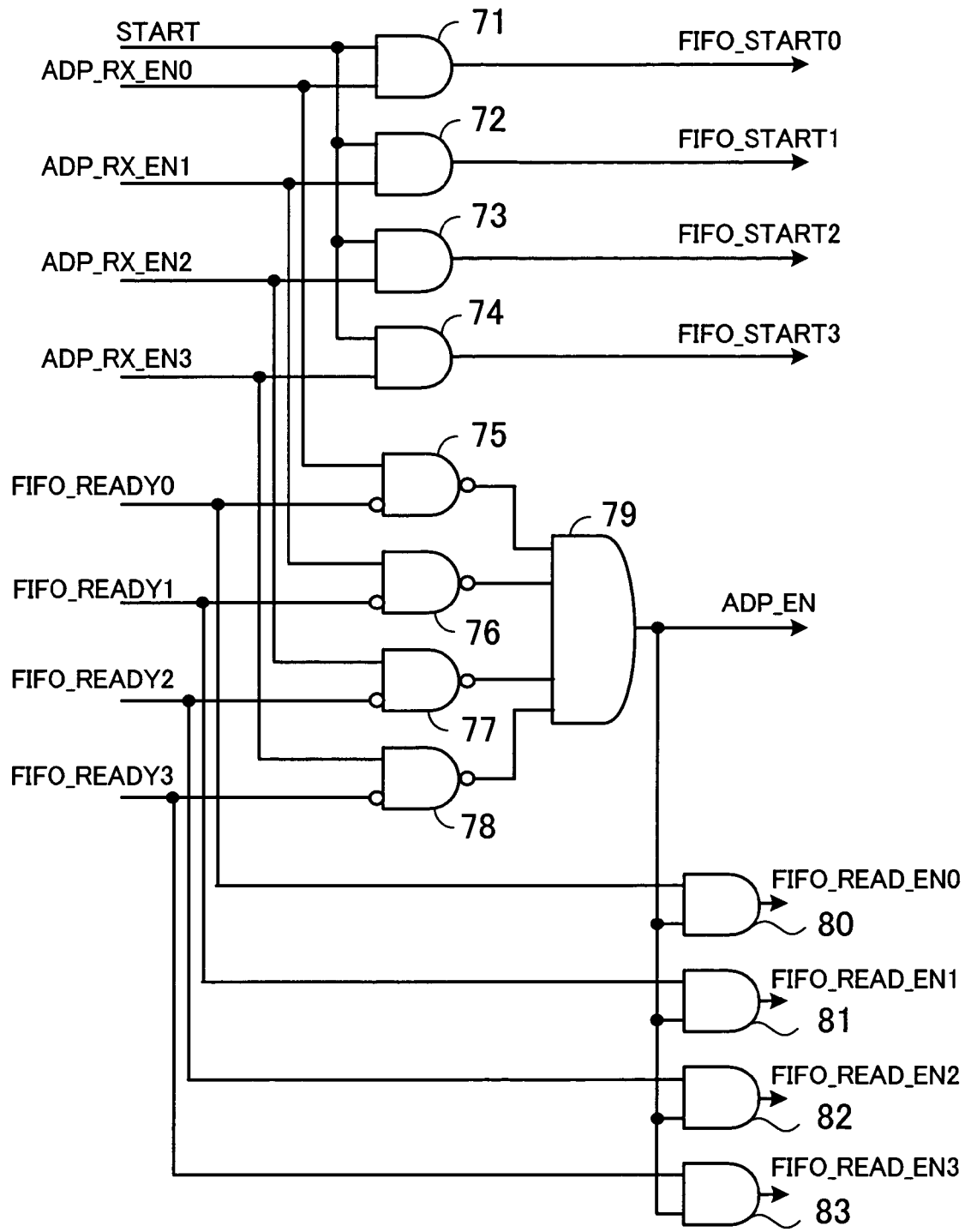
FIG. 8 is a diagram illustrating a circuit configuration of an adaptive-equalization control circuit in the data receiver according to the first embodiment.

FIG. 8 is a diagram illustrating a circuit configuration of the adaptive-equalization control circuit 35. The adaptive-equalization control circuit 35 of FIG. 8 comprises AND circuits 71 to 74 and 79 to 83 and NAND circuits 75 to 78, where one of two input terminals of each of the NAND circuits 75 to 78 is an inverted input terminal.

The aforementioned start signal START is inputted into the first input terminals of the AND circuits 71 to 74, and the aforementioned enable signals ADP_RX_EN0 to ADP_RX_EN3 are inputted into the second input terminals of the AND circuits 71 to 74, respectively. When the start signal START is at the high level, the AND circuits 71 to 74 output to the FIFO circuits 33a to 33d the aforementioned start signals FIFO_START0 to FIFO_START3 according to the enable signals ADP_RX_EN0 to ADP_RX_EN3, respectively. Thus, one or more of the FIFO circuits 33a to 33d which are to be activated are selected.

The aforementioned enable signals ADP_RX_EN0 to ADP_RX_EN3 are respectively inputted into the non-inverted input terminals of the NAND circuits 75 to 78, and the aforementioned ready signals FIFO_READY0 to FIFO_READY3, which are outputted from the FIFO circuits 33a to 33d, are respectively inputted into the inverted input terminals of the NAND circuits 75 to 78. The outputs of the NAND circuits 75 to 78 are inputted into the AND circuit 79. When the enable signals ADP_RX_EN0 to ADP_RX_EN3 and the ready signals FIFO_READY0 to FIFO_READY3 are at the high level, the AND circuit 79 outputs the aforementioned enable signal ADP_EN, which is at the high level. Thus, the adaptive-equalization calculation circuit 36 is activated.

The above enable signal ADP_EN is inputted into the first input terminals of the AND circuits 80 to 83, and the ready signals FIFO_READY0 to FIFO_READY3 are inputted into the second input terminals of the AND circuits 80 to 83, respectively. When the enable signal ADP_EN and the ready signals FIFO_READY0 to FIFO_READY3 are at the high level, the AND circuits 80 to 83 output to the FIFO circuits 33a to 33d the enable signals FIFO_READ_EN0 to FIFO_READ_EN3, which are at the high level. Then, the FIFO circuits 33a to 33d output to the adaptive-equalization calculation circuit 36 data elements of the data sequences ADP_DT0 to ADP_DT3 (for calculation of the equalization coefficients) which have been stored in the FIFO circuits 33a to 33d.

Hereinbelow, examples of the FIFO circuits 33a to 33d are explained in detail.

Figure 9:
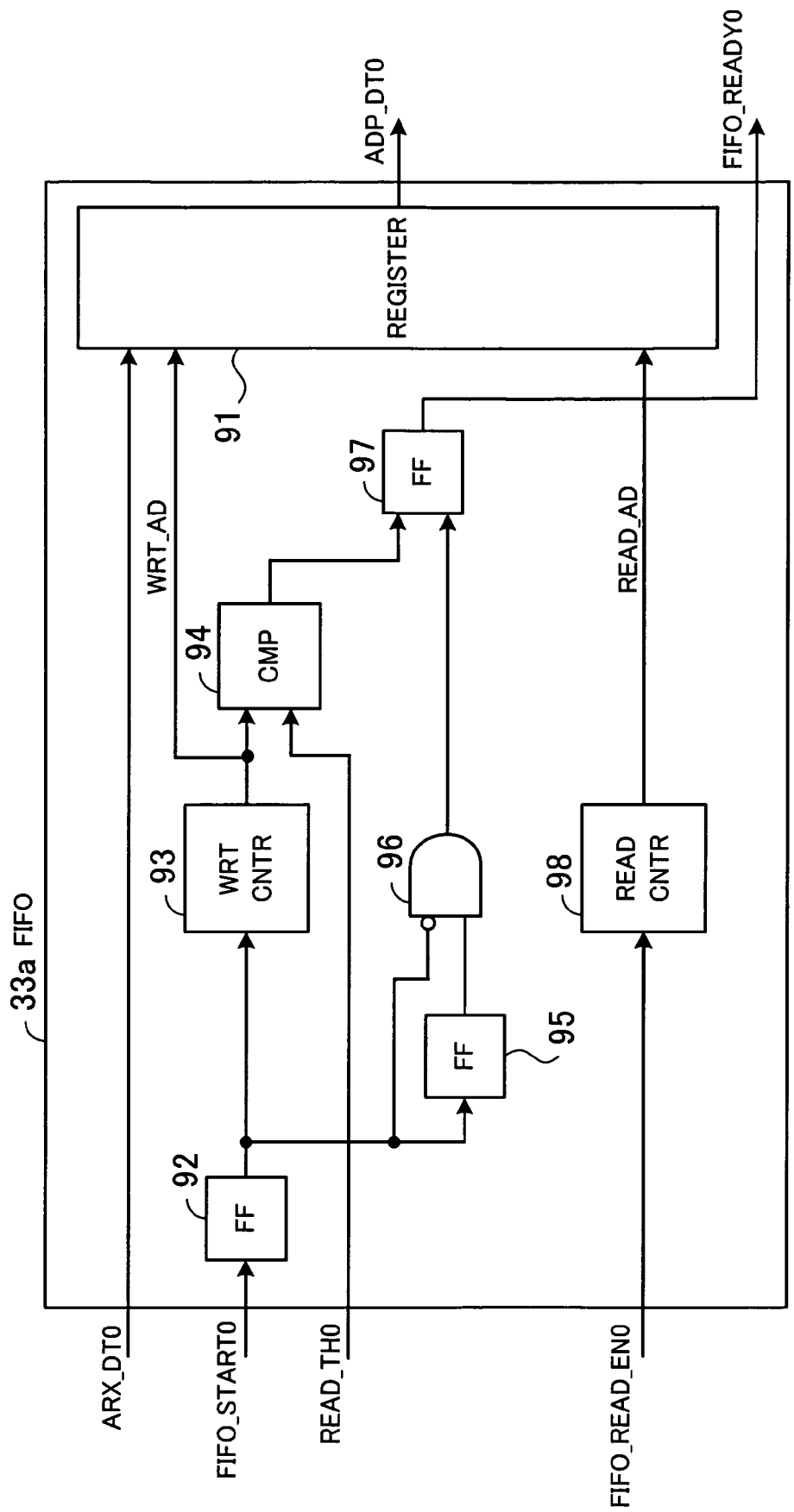
FIG. 9 is a diagram illustrating a circuit configuration of one of FIFO circuits in the data receiver according to the first embodiment.

FIG. 9 is a diagram illustrating a circuit configuration of the FIFO circuit 33a in the data receiver of FIG. 4. The FIFO circuit 33a of FIG. 9 comprises a register 91, flip-flop circuits (FFs) 92, 95, and 97, a write counter (WRT CNTR) 93, a comparator (CMP) 94, an AND circuit 96, and a read counter (READ CNTR) 98.

Although not shown in FIG. 9, the aforementioned clock signal ARX_CLK0 is supplied to the flip-flop circuit 92. Therefore, the flip-flop circuit 92 outputs the aforementioned start signal FIFO_START0 to the write counter 93 in synchronization with the clock signal ARX_CLK0.

Although not shown in FIG. 9, the clock signal ARX_CLK0 is also supplied to the write counter 93, and the start signal FIFO_START0 is inputted from the flip-flop circuit 92 into the write counter 93. When the start signal FIFO_START0 is inputted into the write counter 93, the write counter 93 starts counting on the basis of the clock signal ARX_CLK0, and generates values of a write address WRT_AD, which are outputted to the register 91 and the comparator 94.

Data elements of the aforementioned data sequence ARX_DT0 (for calculation of the equalization coefficients) which are outputted from the reception circuit 32a are inputted into the register 91. The register 91 stores the respective data elements of the data sequence ARX_DT0 on the basis of the write address WRT_AD.

The aforementioned threshold signal READ_TH0 and the values of the write address WRT_AD (which are outputted from the write counter 93) are inputted into the comparator 94. The comparator 94 compares the value indicated by the threshold signal READ_TH0 and each value of the write address WRT_AD, and outputs a predetermined signal to the flip-flop circuit 97 when the increase in the value of the write address WRT_AD is equal to or greater the value indicated by the threshold signal READ_TH0.

Although not shown in FIG. 9, the clock signal ARX_CLK0 is further applied to the flip-flop circuit 95. The flip-flop circuit 95 outputs to the AND circuit 96 the signal outputted from the flip-flop circuit 92, in synchronization with the clock signal ARX_CLK0. The AND circuit 96 receives the signal outputted from the flip-flop circuit 92, as well as the signal outputted from the flip-flop circuit 95.

The signal outputted from the comparator 94 and the signal outputted from the AND circuit 96 are inputted into the flip-flop circuit 97. In addition, although not shown in FIG. 9, the aforementioned clock signal ADP_CLKA, which is generated in the equalizer adapter 34, is supplied to the flip-flop circuit 97. The flip-flop circuit 97 outputs the signal outputted from the comparator 94, as the aforementioned ready signal FIFO_READY0 in synchronization with the clock signal ADP_CLKA. That is, when the number of data elements of the data sequence ARX_DT0 (for calculation of the equalization coefficients) which are stored in the register 91 becomes equal to or greater than the number indicated by the threshold signal READ_TH0, the flip-flop circuit 97 outputs the ready signal FIFO_READY0 to the adaptive-equalization control circuit 35 in synchronization with the clock signal ADP_CLKA. When the level of the start signal FIFO_START0 inputted into the flip-flop circuit 92 becomes low, the flip-flop circuit 97 resets the ready signal FIFO_READY0, which is outputted from the flip-flop circuit 97.

Although not shown in FIG. 9, the clock signal ADP_CLKA is also supplied to the read counter 98. In addition, the enable signal FIFO_READ_EN0 outputted from the adaptive-equalization control circuit 35 is inputted into the read counter 98. When the enable signal FIFO_READ_EN0 is inputted into the read counter 98, the read counter 98 starts counting on the basis of the clock signal ADP_CLKA, and generates values of a read address READ_AD, which are outputted to the register 91. The register 91 outputs data elements of the data sequence ARX_DT0 which have been stored in the register 91, as data elements of the data sequence ADP_DT0 for calculation of the equalization coefficients, on the basis of the values of the read address READ_AD.

As explained above, the flip-flop circuits 92 and 95 and the write counter 93 operate in synchronization with the clock signal ARX_CLK0, which is outputted from the reception circuit 32a. In addition, the flip-flop circuit 97 and the read counter 98 operate in synchronization with the clock signal ADP_CLKA. Therefore, the reception circuit 32a can write data elements of the data sequence ARX_DT0 for calculation of the equalization coefficients, in synchronization with the clock signal ARX_CLK0, and the equalizer adapter 34 can read out data elements of the data sequence ADP_DT0 for calculation of the equalization coefficients, in synchronization with the clock signal ADP_CLKA, which is generated by the equalizer adapter 34.

Similarly, the reception circuits 32b to 32d, which have similar circuit configurations to the reception circuit 32a, can write data elements of the data sequences ARX_DT1 to ARX_DT3 (for calculation of the equalization coefficients), in synchronization with the clock signals ARX_CLK1 to ARX_CLK3, respectively, and the equalizer adapter 34 can read out data elements of the data sequences ADP_DT1 to ADP_DT3 (for calculation of the equalization coefficients), in synchronization with the clock signal ADP_CLKA, which is generated by the equalizer adapter 34.

Since the differences in the clock timing can be absorbed by use of the FIFO circuits 33a to 33d as explained above, it is possible to calculate the equalization coefficient sets EQ0 to EQ3 by using the equalizer adapter 34, the number of which is smaller than the number of the reception circuits 32a to 32d.

Figure 10:
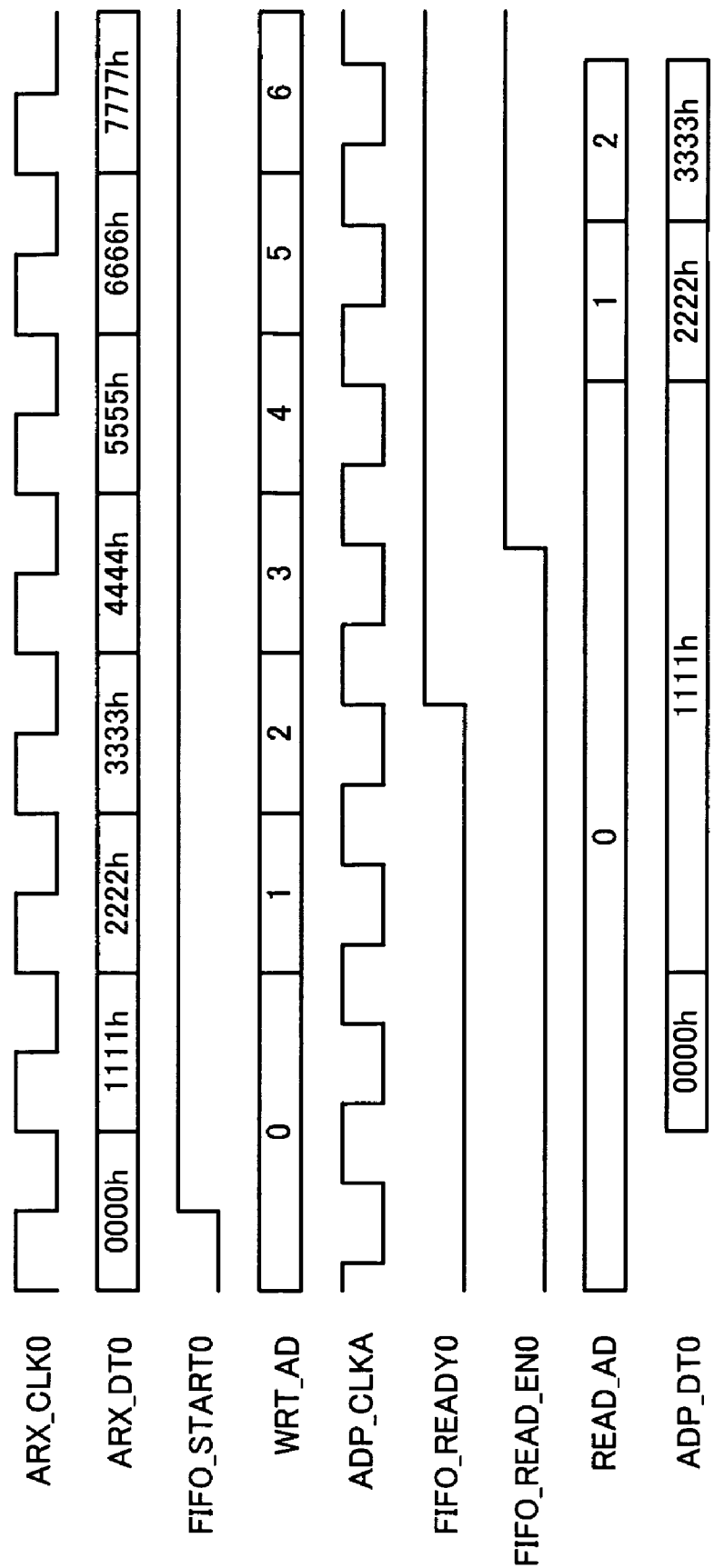
FIG. 10 is a timing diagram of operations of the FIFO circuit of FIG. 9.

Next, operations of the FIFO circuit 33a are explained below with reference to FIG. 10, which is a timing diagram of the operations of the FIFO circuit 33a of FIG. 9. In FIG. 10, examples of timings of the clock signal ARX_CLK0 and data elements of the data sequence ARX_DT0 (which are outputted from the reception circuit 32a), the start signal FIFO_START0 (outputted from the adaptive-equalization control circuit 35), the clock signal ADP_CLKA and the enable signal FIFO_READ_ENO (which are generated in the equalizer adapter 34), and the values of the write address WRT_AD, the values of the read address READ_AD, the ready signal FIFO_READY0, and data elements of the data sequence ADP_DT0 (which are generated in the FIFO circuit 33a) are indicated. In the example of FIG. 9, it is assumed that a threshold signal READ_TH0 indicating the threshold value of two is inputted into the FIFO circuit 33a.

The reception circuit 32a outputs data elements of the data sequence ARX_DT0 (for calculation of the equalization coefficients) in synchronization with the clock signal ARX_CLK0 as indicated in FIG. 10.

When the start signal FIFO_START0 is outputted from the adaptive-equalization control circuit 35 as indicated in FIG. 10, the write counter 93 in the FIFO circuit 33a outputs values of the write address WRT_AD in synchronization with the clock signal ARX_CLK0.

Since the threshold signal READ_TH0 indicates the threshold value of two, when two data elements of the data sequence ADP_DT0 (for calculation of the equalization coefficients) are newly stored in the register 91 (i.e., when the value of the write address WRT_AD increases by two), the FIFO circuit 33a outputs the ready signal FIFO_READY0 in synchronization with the clock signal ADP_CLKA.

When the adaptive-equalization control circuit 35 receives the ready signal FIFO_READY0 from the FIFO circuit 33a, the adaptive-equalization control circuit 35 outputs the enable signal FIFO_READ_ENO as indicated in FIG. 10. When the FIFO circuit 33a receives the enable signal FIFO_READ_ENO from the adaptive-equalization control circuit 35, the FIFO circuit 33a generates the read address READ_AD as indicated in FIG. 10, and outputs data elements of the data sequence ADP_DT0 (for calculation of the equalization coefficients).

Thus, data elements of the data sequence ARX_DT0 are written in the FIFO circuit 33a, and are thereafter read out as data elements of the data sequence ADP_DT0 for calculation of the equalization coefficients.

Hereinbelow, the operations of the data receiver of FIG. 4 are explained.

First, the adaptive-equalization control circuit 35 instructs the FIFO circuits 33a to 33d and the adaptive-equalization calculation circuit 36 to operate. The FIFO circuits 33a to 33d are provided for absorbing the differences between the timings of the reception circuits 32a to 32d, and the adaptive-equalization control circuit 35 or adaptive-equalization calculation circuit 36. Data elements of the data sequence ARX_DT0 to ARX_DT3 for calculation of the equalization coefficients (which realize adaptive equalization in the reception circuits 32a to 32d) are once written in the FIFO circuits 33a to 33d, and thereafter respective data elements of each of the data sequences ARX_DT0 to ARX_DT3 (as data elements of the data sequences ADP_DT0 to ADP_DT3) are read out in succession by the adaptive-equalization calculation circuit 36. The adaptive-equalization calculation circuit 36 calculates the equalization coefficient sets EQ0 to EQ3 for the equalizers in the reception circuits 32a to 32d by using the data elements of the data sequences ADP_DT0 to ADP_DT3.

Figure 18:
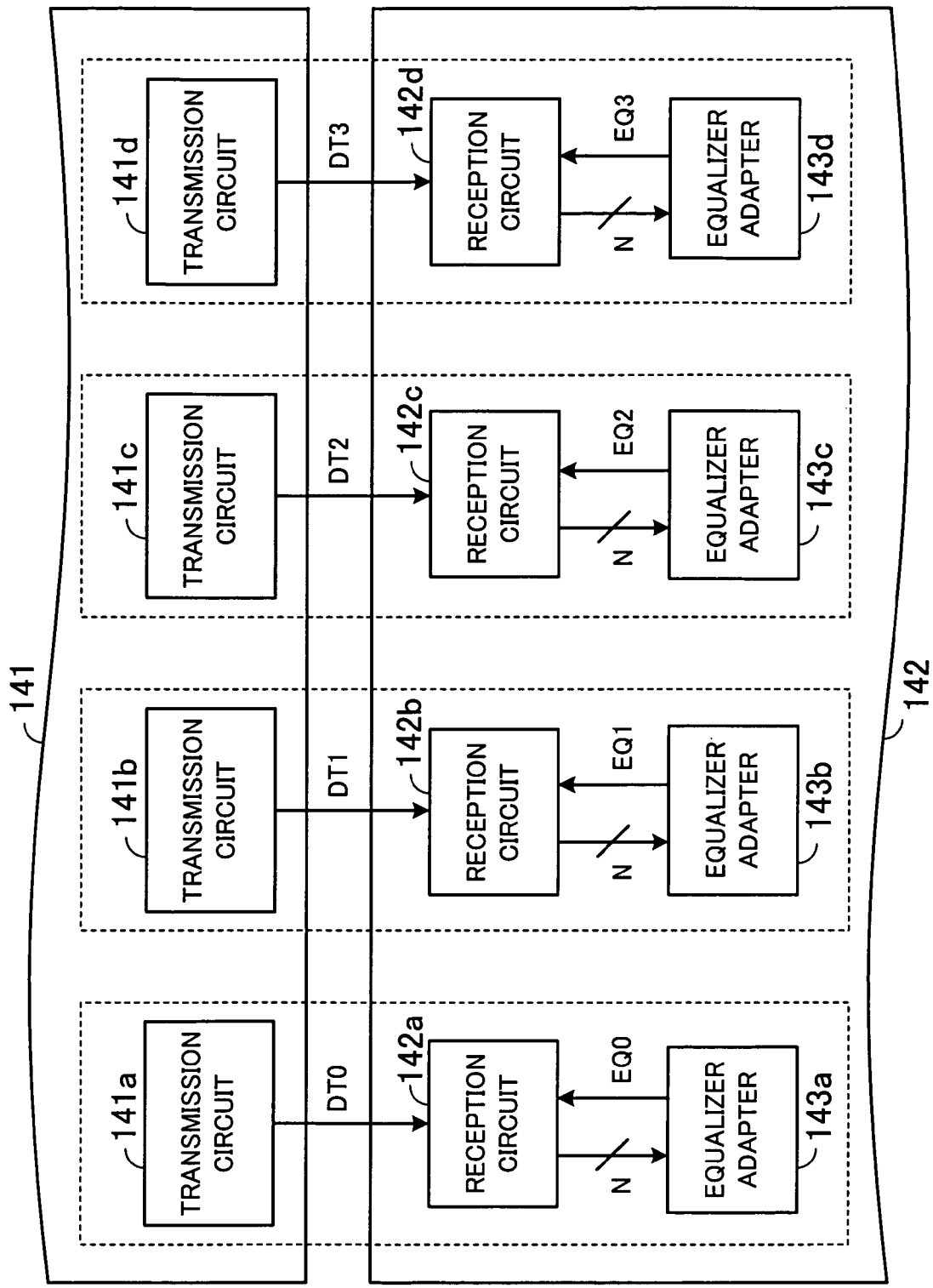
FIG. 18 is a diagram illustrating an example of a configuration of a data receiver.

Incidentally, in the case where the adaptive-equalization calculation circuit 36 performs calculation for the adaptive equalization without averaging data in each of the data sequences ADP_DT0 to ADP_DT3, the amount of data processed by the adaptive-equalization calculation circuit 36 is four times larger than the amount of data processed by each of the equalizer adapters 143a to 143d in the configuration of FIG. 18.

On the other hand, in the case where data in each of the data sequences ADP_DT0 to ADP_DT3 are averaged, it is possible to reduce the influence of local errors produced by noise occurring in the reception circuits 32a to 32d or other causes, and increase the convergence precision of the adaptive equalization loop. For example, the processing for averaging data in each of the data sequences ADP_DT0 to ADP_DT3 can be realized by reducing the time constant of the adaptive equalization loop to one-fourth. That is, when the values of the ssp's in the adaptive-equalization calculation circuit 36 of FIG. 7 are reduced to one-fourth, the convergence precision of the adaptive equalization loop can be increased without making the convergence rate smaller than the convergence rates of the conventional equalizer adapters.

Further, it is possible to perform the calculation of the equalization coefficients so as to increase the convergence rate immediately after the calculation for adaptive equalization is started, and increase the convergence precision after a tendency toward convergence of the equalization coefficients of the equalizers in the reception circuits 32a to 32d appears. The calculation in this manner can be realized by an operation of the ssp controller 64 illustrated in FIG. 7. The ssp controller 64 can monitor the outputs of the integrators 65 to 67, and control the ssp's according to the outputs of the integrators 65 to 67.

As explained above, since, according to the first embodiment, the single equalizer adapter 34 is provided for calculating the equalization coefficients for the equalizers in all the reception circuits 32a to 32d, it is possible to reduce the size of the circuitry and the power consumption.

In addition, in the case where the equalization coefficients are not averaged, the convergence rate of the equalization coefficients is n times increased, and the convergence time is n times reduced. However, the convergence precision of the equalization coefficients can be increased by averaging the equalization coefficients.

Alternatively, it is possible to provide an equalizer adapter for every predetermined number of ones of the reception circuits 32a to 32d, where the predetermined number is two or greater. For example, an equalizer adapter may be provided for the reception circuits 32a and 32b, and another equalizer adapter may be provided for the reception circuits 32c and 32d. Even in this case, it is possible to make the circuit size and the power consumption small compared with the case where an equalizer adapter is provided for each of the reception circuits 32a to 32d.

Second Embodiment

Hereinbelow, the second embodiment of the present invention is explained in detail with reference to FIGS. 11 to 16.

Figure 11:
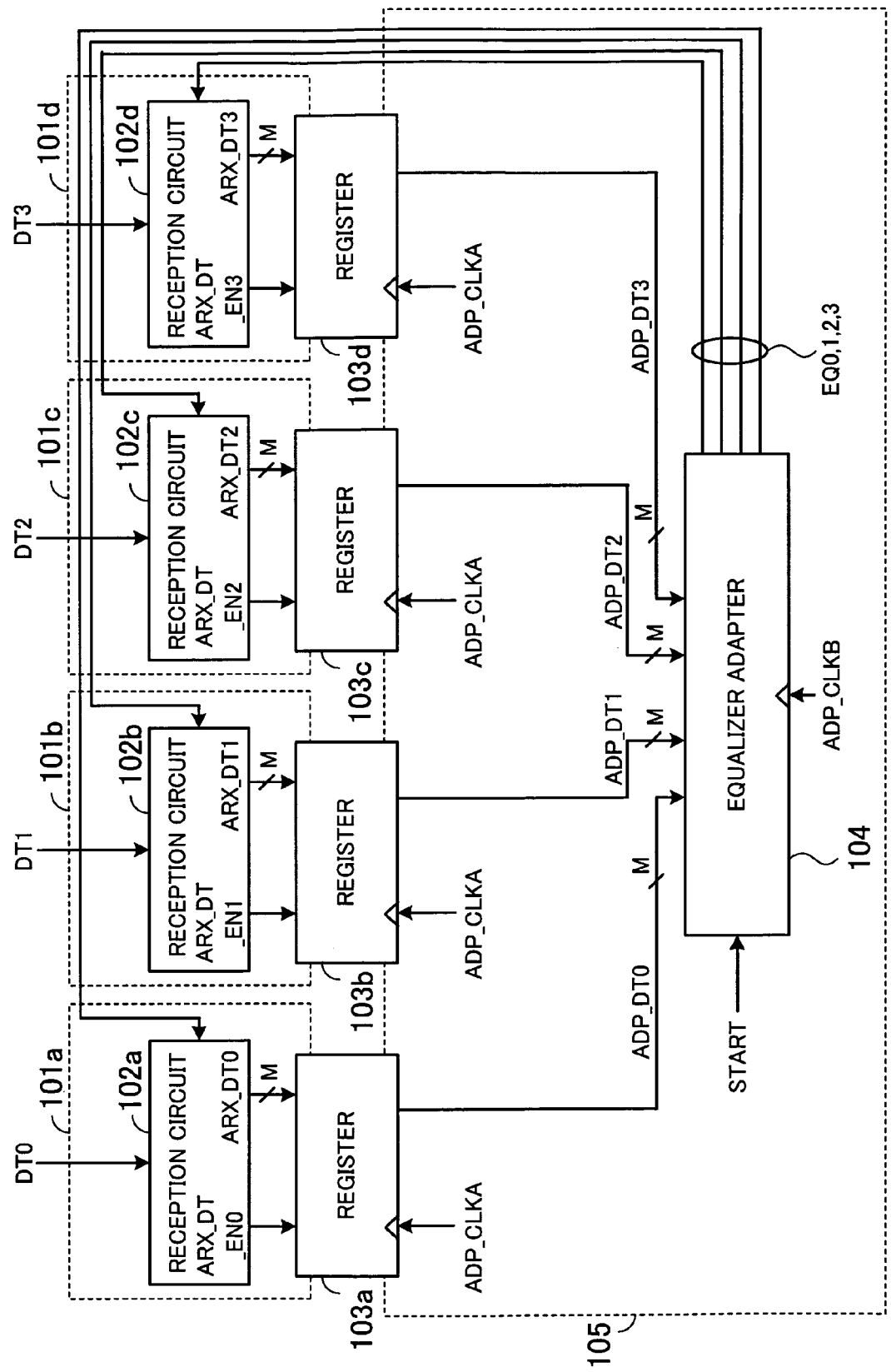
FIG. 11 is a diagram illustrating a circuit configuration of a data receiver according to a second embodiment of the present invention.

FIG. 11 is a diagram illustrating a circuit configuration of a data receiver according to the second embodiment. The data receiver of FIG. 11 comprises reception circuits 102a to 102d, registers 103a to 103d, and an equalizer adapter 104. In addition, in FIG. 11, the dotted frames 101a to 101d and 105 indicate the boundaries of clock domains. That is, the circuits indicated in each of the dotted frames 101a to 101d and 105 operate asynchronously with the circuits in the other dotted frames. When the data receiver of FIG. 11 is compared with the communication device of FIG. 2, the reception circuits 102a to 102d correspond to the reception circuits on the LSI chip 13a, and the equalizer adapter 104 corresponds to the equalizer adapter on the LSI chip 13a. In addition, in the case where the data receiver of FIG. 11 is realized in the construction of FIG. 2, the reception circuits 102a to 102d corresponding to the reception circuits on the LSI chip 13a are point-to-point connected to the transmission circuits on the LSI chip 12a through the transmission lines in the backboard 11.

The reception circuits 102a to 102d respectively receive data signals DT0 to DT3 through transmission lines, and respectively comprise equalizers (not shown). The equalizer adapter 104 receives predetermined data from the reception circuits 102a to 102d, and calculates the equalization coefficients for the equalizers on the basis of the predetermined data so that the equalizers can appropriately perform waveform shaping of the data signals DT0 to DT3. Then, the equalizer adapter 104 supplies the calculated equalization coefficients to the corresponding reception circuits 102a to 102d. In addition, each of the reception circuits 102a to 102d has a circuit configuration similar to the configuration of FIG. 5.

Since the single equalizer adapter 104 is provided for the reception circuits 102a to 102d, and the reception circuits 102a to 102d independently receive and process the data signals DT0 to DT3, the operation timings of the reception circuits 102a to 102d are different. Although the frequencies of the operation clock signals of the reception circuits 102a to 102d are identical, the phases of the operation clock signals are different. Therefore, in order to enable transfer of data between the single equalizer adapter 104 and all the reception circuits 102a to 102d, it is necessary to synchronize the operation timings of the reception circuits 102a to 102d and the equalizer adapter 104. Therefore, according to the second embodiment, the registers 103a to 103d are provided for the reception circuits 102a to 102d, respectively. Thus, when the reception circuits 102a to 102d write the data in the registers 103a to 103d, and the equalizer adapter 104 reads the data from the registers 103a to 103d, the data can be transferred from the reception circuits 102a to 102d to the equalizer adapter 104.

The reception circuits 102a to 102d output to the registers 103a to 103d data elements of M-bit data sequences ARX_DT0 to ARX_DT3 needed for calculation of equalization coefficients for the equalizers, and receive equalization coefficient sets EQ0 to EQ3 from the equalizer adapter 104. The equalizers in the reception circuits 102a to 102d perform waveform shaping of the data signals DT0 to DT3 on the basis of the equalization coefficient sets EQ0 to EQ3 so that the data represented by the data signals DT0 to DT3 can be correctly decided. In addition, the reception circuits 102a to 102d output to the registers 103a to 103d data-valid signals ARX_DT_EN0 to ARX_DT_EN3 indicating the valid periods of data elements of the data sequences ARX_DT0 to ARX_DT3, respectively.

Figure 12:
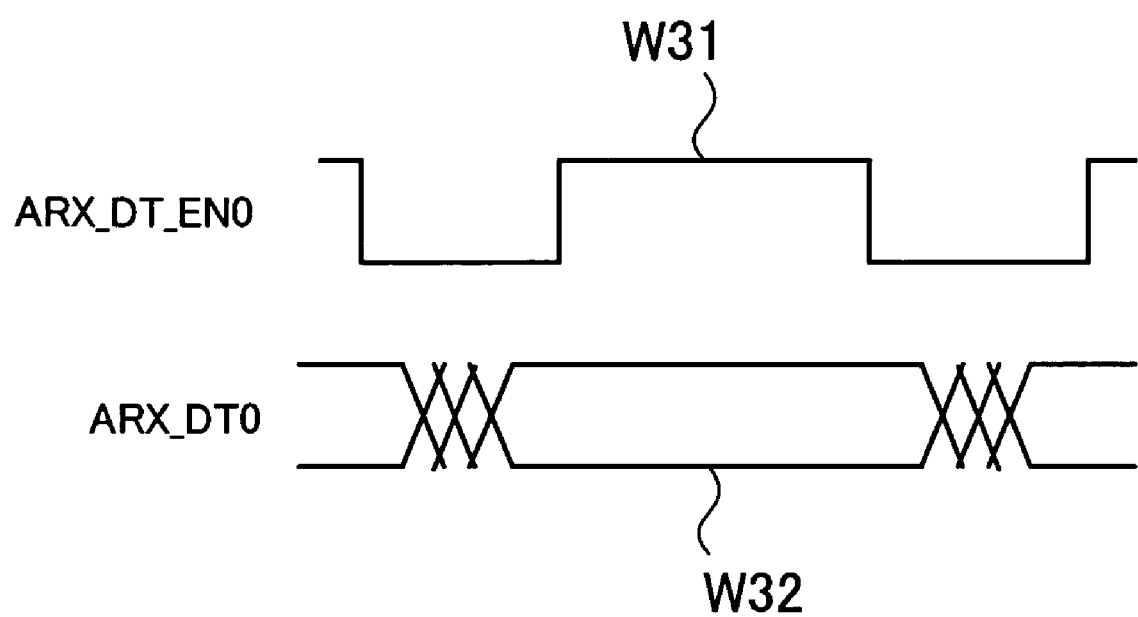
FIG. 12 is a diagram illustrating timings of a data-valid signal and a data element transferred for calculation of equalization coefficients in the data receiver of FIG. 11.

FIG. 12 is a diagram illustrating timings of a data-valid signal and a data element transferred for calculation of the equalization coefficients in the data receiver of FIG. 11. In FIG. 12, the reference W31 indicates a waveform of the data-valid signal ARX_DT_EN0, and the reference W32 indicates the timings of data elements of the data sequence ARX_DT0 for use in calculation of the equalization coefficients. That is, the data-valid signal ARX_DT_EN0 with the waveform W31 indicates one of periods in which data elements of the data sequence ARX_DT0 are valid. Although not shown, the data-valid signals ARX DT_EN1 to ARX DT_EN3 indicate periods in which data elements of the data sequences ARX_DT1 to ARX_DT3 are valid, respectively, in similar manners to the data-valid signals ARX_DT_EN0.

Referring back to FIG. 11, a clock signal ADP_CLKA, which synchronizes with the operation timing of the equalizer adapter 104, is inputted into the registers 103a to 103d. The registers 103a to 103d output to the equalizer adapter 104 data elements of the M-bit data sequences ARX_DT0 to ARX_DT3 (which have been written by the reception circuits 102a to 102d and are temporarily stored in the registers 103a to 103d) as data elements of M-bit data sequence ADP_DT0 to ADP_DT3, in synchronization with the rising edges or the falling edges of the clock signal ADP_CLKA.

The equalizer adapter 104 has a circuit configuration similar to the configuration of FIG. 7, and calculates equalization coefficient sets EQ0 to EQ3.

Specifically, when the equalizer adapter 104 receives a start signal START, the equalizer adapter 104 starts operation. A clock signal ADP_CLKB is supplied to the equalizer adapter 104, and the equalizer adapter 104 operates in synchronization with the clock signal ADP_CLKB. The equalizer adapter 104 reads out from the registers 103a to 103d data elements of the data sequences ADP_DT0 to ADP_DT3 for calculation of the equalization coefficients, and calculates the equalization coefficient sets EQ0 to EQ3 on the basis of the data elements of the data sequences ADP_DT0 to ADP_DT3 so that the equalizers in the reception circuits 102a to 102d can perform waveform shaping of the data signals DT0 to DT3. The equalizer adapter 104 supplies the calculated equalization coefficient sets EQ0 to EQ3 to the reception circuits 102a to 102d.

Hereinbelow, the registers 103a to 103d are explained in detail.

Figure 13:
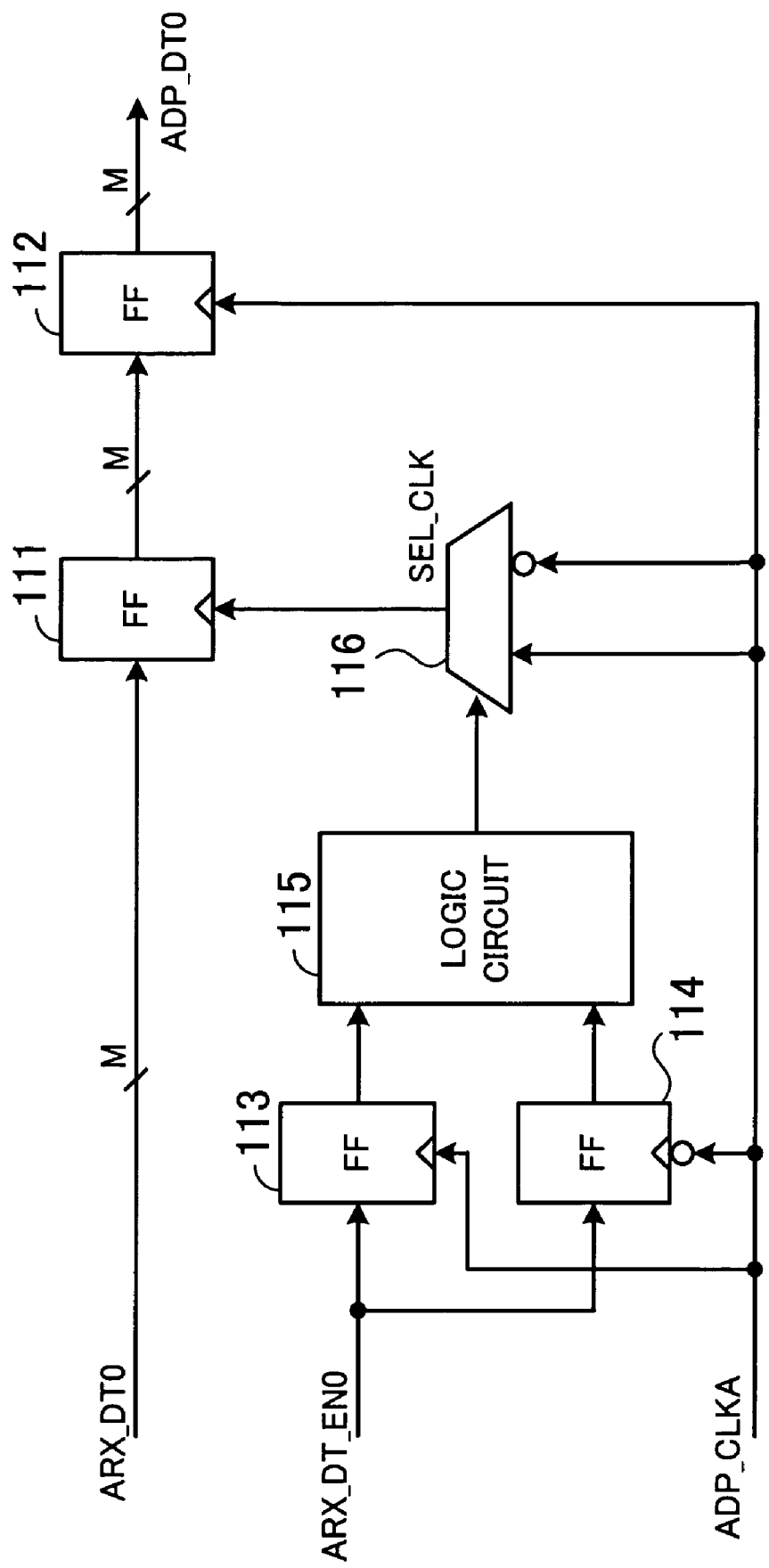
FIG. 13 is a circuit diagram of one of registers in the data receiver according to the second embodiment.

FIG. 13 is a circuit diagram of the register 103a in the data receiver of FIG. 11. The register illustrated in FIG. 13 comprises flip-flop circuits (FFs) 111 to 114, a logic circuit 115, and a selector 116.

A selector clock signal SEL_CLK, which is outputted from the selector 116, is supplied to the flip-flop circuit 111, and data elements of the data sequence ARX_DT0, which are outputted from the reception circuit 102a, are supplied to the flip-flop circuit 111. The flip-flop circuit 111 outputs data elements of the data sequence ARX_DT0 to the flip-flop circuit 112 in synchronization with the selector clock signal SEL_CLK. The clock signal ADP_CLKA is supplied to the flip-flop circuits 112 to 114, which operate in synchronization with the clock signal ADP_CLKA.

The data-valid signal ARX_DT_EN0, which is outputted from the reception circuit 102a, is supplied to the flip-flop circuits 113 and 114. The input terminal through which clock signal ADP_CLKA is supplied to the flip-flop circuit 114 is an inverted input terminal. The flip-flop circuit 113 outputs the state of the data-valid signal ARX_DT_EN0 to the logic circuit 115 in synchronization with a rising edge of the clock signal ADP_CLKA, and the flip-flop circuit 114 outputs the state of the data-valid signal ARX_DT_EN0 to the logic circuit 115 in synchronization with a falling edge of the clock signal ADP_CLKA.

The logic circuit 115 outputs to the selector 116 a signal at the high or low level according to the outputs of the flip-flop circuits 113 and 114. Specifically, the logic circuit 115 outputs a signal at the low level only when the output of the flip-flop circuit 113 is at the high level. Otherwise, the output of the logic circuit 115 is at the high level.

The clock signal ADP_CLKA is further inputted into the selector 116 through both of inverted and non-inverted input terminals of the selector 116. The selector 116 outputs the clock signal ADP_CLKA or the inversion of the clock signal ADP_CLKA as the selector clock signal SEL_CLK to the flip-flop circuit 111. For example, the selector 116 is arranged to output the clock signal ADP_CLKA as the selector clock signal SEL_CLK when the output of the logic circuit 115 is at the low level, and output the inversion of the clock signal ADP_CLKA as the selector clock signal SEL_CLK when the output of the logic circuit 115 is at the high level.

That is, the register 103a outputs each data element of the data sequence ADP_DT0 (for calculation of the equalization coefficients) in synchronization with a rising edge of the clock signal ADP_CLKA at which the data-valid signal ARX_DT_EN0 is outputted (i.e., at which the data-valid signal ARX_DT_EN0 is at the high level). Similarly, the registers 103b to 103d respectively output data elements of the data sequences ADP_DT1 to ADP_DT3 (for calculation of the equalization coefficients) in synchronization with the rising edges of the clock signal ADP_CLKA.

Figure 14:
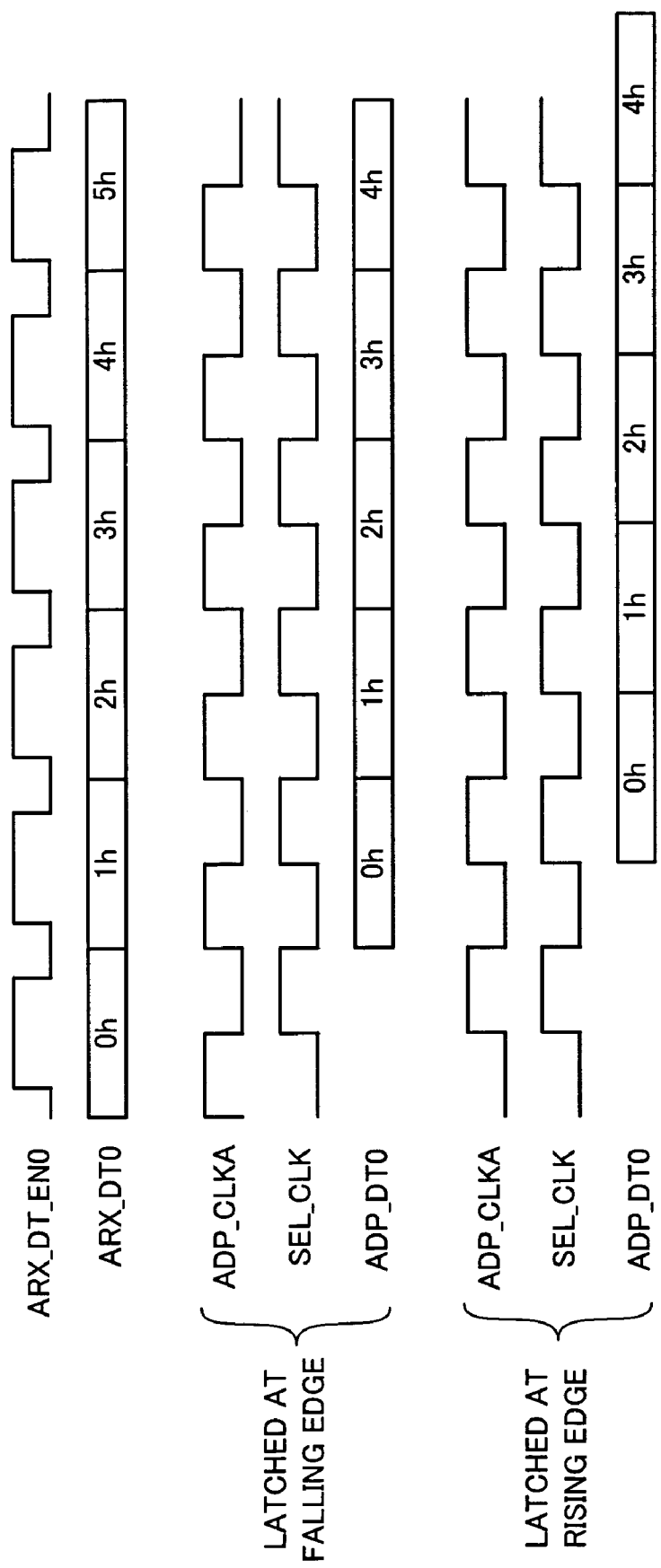
FIG. 14 is a timing diagram of operations of the register of FIG. 13.

The operations of the register 103a of FIG. 13 are explained below with reference to FIG. 14, which is a timing diagram of the operations of the register of FIG. 13. In FIG. 14, examples of timings of the data-valid signal ARX_DT_EN0 and data elements of the data sequence ARX_DT0 (which are outputted from the reception circuit 102a) are indicated. In addition, examples of timings of the clock signal ADP_CLKA, the selector clock signal SEL_CLK, and data elements of the data sequence ADP_DT0 are also indicated for the case where the data elements of the data sequence ARX_DT0 are inputted in synchronization with the falling edges of the clock signal ADP_CLKA, and for the case where the data elements of the data sequence ARX_DT0 are inputted in synchronization with the rising edges of the clock signal ADP_CLKA.

As indicated in FIG. 14, the register 103a detects a rising edge or a falling edge of the clock signal ADP_CLKA at which each data element of the data sequence ARX_DT0 (for calculation of the equalization coefficients) is valid, on the basis of the data-valid signal ARX_DT_EN0, and outputs the data element of the data sequence ARX_DT0, in synchronization with the detected edge of the clock signal ADP_CLKA.

Next, generation of data elements of the data sequence ARX_DT0 and the data-valid signal ARX_DT_EN0 in the reception circuit 102a is explained below.

Figure 15:
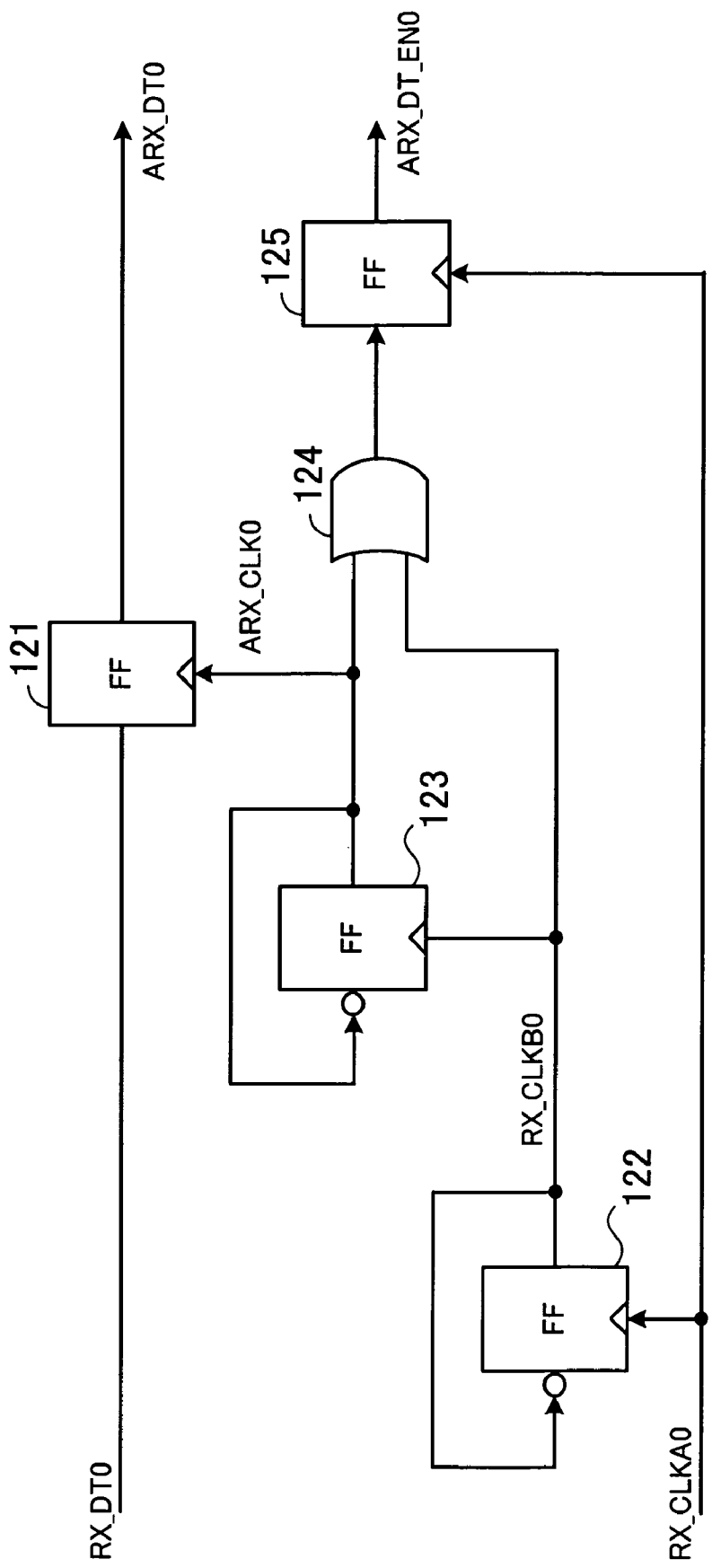
FIG. 15 is a diagram of a circuit for generating a data-valid signal and data for calculation of equalization coefficients, in one of reception circuits in the data receiver according to the second embodiment.

FIG. 15 is a diagram of an example of a circuit arranged in the reception circuit 102a for generating the data-valid signal ARX_DT_EN0 and data elements of the data sequence ARX_DT0. The reception circuit of FIG. 15 comprises flip-flop circuits (FFs) 121 to 123 and 125 and an OR circuit 124.

A clock signal ARX_CLK0 and data elements of a data sequence RX_DT0 received through a transmission line are inputted into the flip-flop circuit 121, and the flip-flop circuit 121 outputs the data elements of the data sequence RX_DT0 as data elements of the data sequence ARX_DT0 for calculation of the equalization coefficients, in synchronization with the clock signal ARX_CLK0.

The flip-flop circuit 122 divides the frequency of a clock signal RX_CLKA0, and outputs the frequency-divided clock signal as a clock signal RX_CLKB0. The flip-flop circuit 123 divides the frequency of the clock signal RX_CLKB0, and outputs the frequency-divided clock signal as the clock signal ARX_CLK0. The OR circuit 124 receives the clock signal ARX_CLK0 from the flip-flop circuit 123 and the clock signal RX_CLKB0 from the flip-flop circuit 122, and outputs a logical sum of the clock signal ARX_CLK0 and the clock signal RX_CLKB0 to the flip-flop circuit 125. The flip-flop circuit 125 operates in synchronization with the clock signal RX_CLKA0, and outputs the output of the OR circuit 124 as the data-valid signal ARX_DT_EN0.

The reception circuit 102a has a function of a demultiplexer. That is, the reception circuit 102a receives the data signal DT0, which is transmitted through a transmission line and carries data in serial form, converts the serial data into an N-bit parallel form, and outputs the N-bit parallel data. For example, in the case where the data signal DT0 carries 10-Gbps serial data, and N is 32, the reception circuit 102a receives the data signal DT0 by receiving, for example, a 5-GHz clock signal from an external PLL, and utilizing the rising and falling edges of the clock signal. Thereafter, the reception circuit 102a divides the frequency of the 5-GHz clock signal, converts the serial data carried by the data signal DT0 into a 32-bit parallel form, and outputs the 32-bit parallel data at the transmission rate of 312.5 Mbps (=10/32 GHz). In the construction of FIG. 15, the ratios of the frequencies of the three clock signals are RX_CLKA0:RX_CLKB0:ARX_CLK0=1:0.5:0.25. Thus, the data elements of the data sequence ARX_DT0 to be used in calculation of the equalization coefficients for adaptive equalization are outputted in synchronization with the clock signal ARX_CLK0. The data-valid signal ARX_DT_EN0, which indicates valid periods of the data elements of the data sequence ARX_DT0, can be produced by synchronizing a logical sum of the clock signal ARX_CLK0 and the clock signal RX_CLKB0 (from which the clock signal ARX_CLK0 is produced) with the clock signal RX_CLKA0 (from which the clock signal ARX_CLKB0 is produced).

Figure 16:
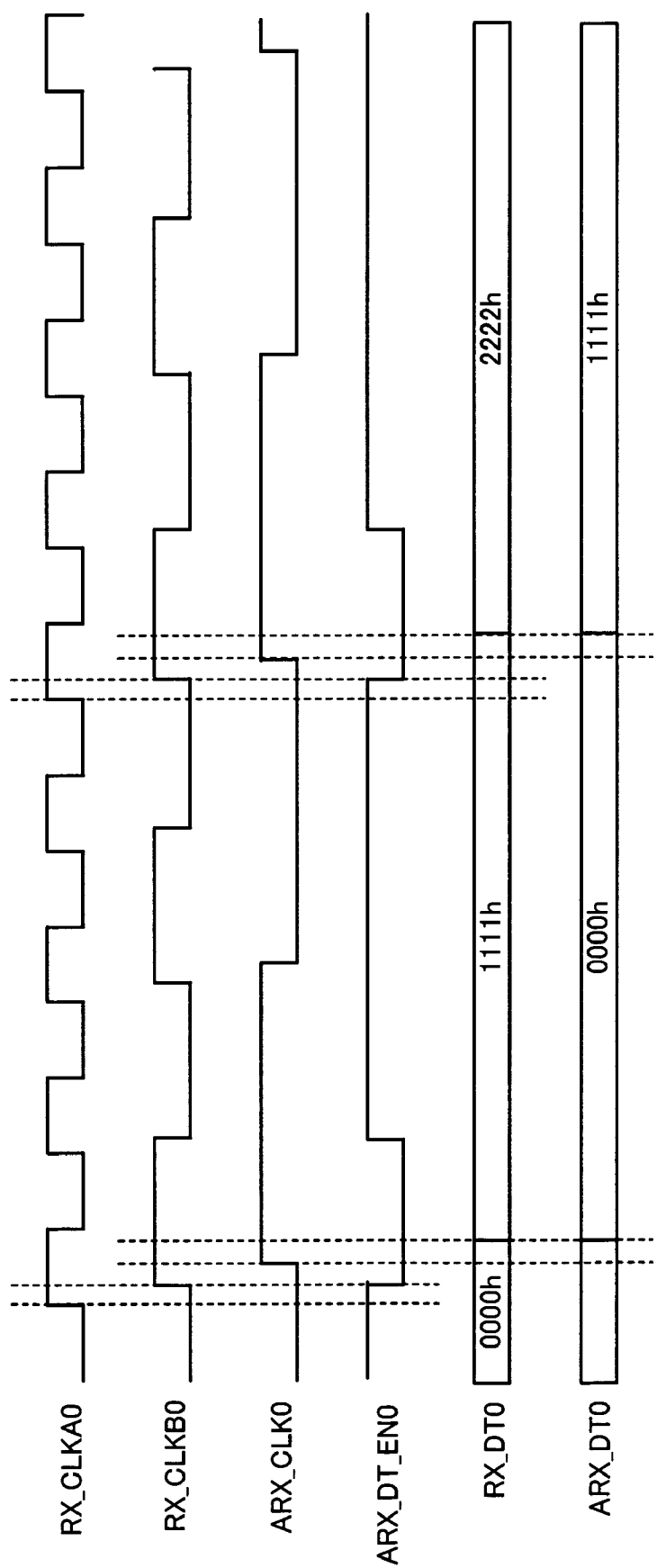
FIG. 16 is a timing diagram of operations of the reception circuit of FIG. 15.

The operations of the reception circuit 102a of FIG. 15 are explained below with reference to FIG. 16, which is a timing diagram of the operations of the reception circuit of FIG. 15. In FIG. 16, timings of the clock signal RX_CLKA0, the clock signal RX_CLKB0, the clock signal ARX_CLK0, the data-valid signal ARX_DT_EN0, the data elements of the data sequence. RX_DT0, and data elements of the data sequence ARX_DT0 are indicated, where the delays occurring in the respective circuit elements are reflected in the timings indicated in FIG. 16.

As indicated in FIG. 16, the clock signal RX_CLKB0 is generated by dividing the frequency of the clock signal RX_CLKB0 by two, the clock signal ARX_CLK0 is generated by dividing the frequency of the clock signal RX_CLKB0 by two, and the data-valid signal ARX_DT_EN0 is generated by synchronizing a logical sum of the clock signal ARX_CLK0 and the clock signal RX_CLKB0 with the clock signal RX_CLKA0. Thus, the data-valid signal ARX_DT_EN0 can indicate the periods in which the data elements of the data sequence ARX_DT0, which are outputted from the flip-flop circuit 121, are valid.

As explained above, according to the second embodiment of the present invention, the single equalizer adapter 104 is provided for calculating the equalization coefficients for the equalizers in all the reception circuits 102a to 102d, it is possible to reduce the size of the circuitry and the power consumption.

In addition, according to the second embodiment, the reception circuits 102a to 102d are arranged to output data-valid signals ARX_DT_EN0 to ARX_DT_EN3 indicating the valid periods of data elements of the data sequences ARX_DT0 to ARX_DT3, respectively, and the equalizer adapter 104 reads out the data elements of the data sequences ARX_DT0 to ARX_DT3 which are latched while the data-valid signals ARX_DT_EN0 to ARX_DT_EN3 are outputted, respectively. Therefore, it is possible to realize clock changeover without a storage device such as a FIFO circuit. Thus, the size of the circuitry and the power consumption can be further reduced.

Alternatively, it is possible to provide an equalizer adapter for every predetermined number of ones of the reception circuits 102a to 102d, where the predetermined number is two or greater. For example, an equalizer adapter may be provided for the reception circuits 102a and 102b, and another equalizer adapter may be provided for the reception circuits 102c and 102d. Even in this case, it is possible to make the circuit size and the power consumption small compared with the case where an equalizer adapter is provided for each of the reception circuits 102a to 102d.

Third Embodiment

Hereinbelow, the third embodiment of the present invention is explained in detail with reference to FIG. 17.

Figure 17:
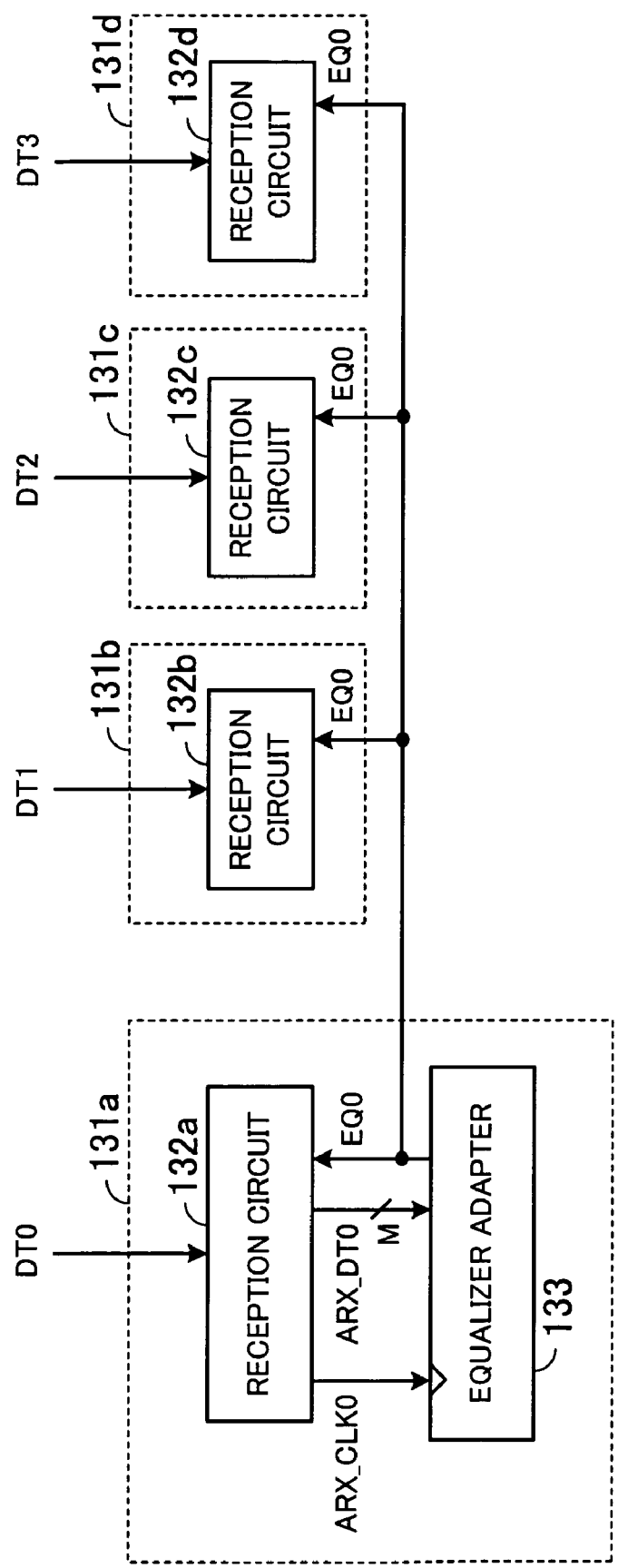
FIG. 17 is a diagram illustrating a circuit configuration of a data receiver according to a third embodiment of the present invention.

FIG. 17 is a diagram illustrating a circuit configuration of a data receiver according to the third embodiment of the present invention. The data receiver of FIG. 17 comprises reception circuits 132a to 132d and an equalizer adapter 133. In addition, in FIG. 17, the dotted frames 131a to 131d indicate the boundaries of clock domains. That is, the circuits indicated in each of the dotted frames 131a to 131d operate asynchronously with the circuits in the other dotted frames. When the data receiver of FIG. 17 is compared with the communication device of FIG. 2, the reception circuits 132a to 132d correspond to the reception circuits on the LSI chip 13a, and the equalizer adapter 133 corresponds to the equalizer adapter on the LSI chip 13a. In addition, in the case where the data receiver of FIG. 17 is realized in the construction of FIG. 2, the reception circuits 132a to 132d corresponding to the reception circuits on the LSI chip 13a are point-to-point connected to the transmission circuits on the LSI chip 12a through the transmission lines in the backboard 11.

The reception circuits 132a to 132d respectively comprise equalizers as illustrated in FIG. 5. The equalizer adapter 133 comprises an adaptive-equalization calculation circuit similar to the adaptive-equalization calculation circuit 36 illustrated in FIG. 7. In the data receiver of FIG. 17, the equalizer adapter 133 receives data elements of M-bit data sequence ARX_DT0 (for calculation of equalization coefficients for the equalizers) in synchronization with a clock signal ARX_CLK0, which is outputted from the reception circuit 132a, and calculates the equalization coefficient set EQ0 for the equalizer in the reception circuit 132a. Although the equalizer adapter 133 is arranged in correspondence with the reception circuit 132a in the example of FIG. 17, alternatively, the equalizer adapter 133 may be arranged in correspondence with any other one of the reception circuits 132b to 132d.

For example, in the case where transmission lines connecting the reception circuits 132a to 132d and corresponding transmission circuits are arranged in an identical backboard such as the backboard 11 in the construction of FIG. 2, it is possible to consider that the data signals DT0 to DT3 are similarly deformed during transmission through the transmission lines, connectors (which connect the transmission lines and the circuit boards 12 and 13), etc. to the reception circuits 132a to 132d. Therefore, it is possible to supply the equalization coefficient set EQ0 calculated by the equalizer adapter 133, to the reception circuits 132b to 132d as well as the reception circuit 132a for waveform shaping of the data signals DT0 to DT3. Thus, according to the third embodiment, the equalizer adapter 133 calculates the equalization coefficient set EQ0 on the basis of only one of the data signals DT0 to DT3, and supplies the calculated equalization coefficient set EQ0 to all the reception circuits 132a to 132d. Thereby, the size of the circuitry and the power consumption can be reduced.

Alternatively, it is possible to provide an equalizer adapter for every predetermined number of ones of the reception circuits 132a to 132d, where the predetermined number is two or greater. For example, an equalizer adapter may be provided for the reception circuits 132a and 132b, and another equalizer adapter may be provided for the reception circuits 132c and 132d. Even in this case, it is possible to make the circuit size and the power consumption small compared with the case where an equalizer adapter is provided for each of the reception circuits 132a to 132d.

Further, the data receiver according to each of the first and second embodiments can be modified in such a manner that the equalizer adapter 34 or 104 calculates the equalization coefficient sets EQ0 to EQ3 on the basis of only one of the data signals DT0 to DT3, and supplies the calculated equalization coefficient sets EQ0 to EQ3 to all the reception circuits 32a to 32d, or 102a to 102d.

As explained above, according to the present invention, an equalizer adapter is provided for all or every predetermined number of ones of a plurality of reception circuits for calculating the equalization coefficients for equalizers in the plurality of reception circuits, and the predetermined number is two or greater. Thereby, the size of the circuitry and the power consumption can be reduced.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A data receiver in which waveforms of data signals are shaped, comprising:
    a plurality of reception circuits each of which receives a data signal through a transmission line, and includes an equalizer having a function of performing waveform shaping of the data signal;
    an equalizer adapter which is arranged in correspondence with all or every predetermined number of ones of the plurality of reception circuits, and calculates equalization coefficients for the equalizer in each of the plurality of reception circuits corresponding to the equalizer adapter based on data from each of the plurality of reception circuits, where the predetermined number is two or greater; and
    a timing absorption unit which absorbs a difference between a first time at which each of the plurality of reception circuits outputs the data and a second time at which the equalizer adapter receives data.

2. The data receiver according to claim 1, wherein the timing absorption unit is realized by a first-in first-out type storage device.

3. The data receiver according to claim 1, wherein the plurality of reception circuits outputs a valid-period signal, and the equalizer adapter receives the data when the valid-period signal is outputted.

4. The data receiver according to claim 1, wherein the equalizer adapter averages the equalization coefficients before outputting the equalization coefficients.

5. The data receiver according to claim 4, wherein the equalizer adapter obtains a predetermined number of successive values of each of the equalization coefficients, and averages the predetermined number of successive values by dividing the predetermined number of successive values by the predetermined number, and summing the predetermined number of successive values, and the predetermined number is the number of the plurality of reception circuits.

6. The data receiver according to claim 1, wherein the equalizer adapter calculates the equalization coefficients for one of all or the portion of the plurality of reception circuits corresponding to the equalizer adapter, and the equalizer adapter outputs the equalization coefficients to the reception circuit other than the one of all or the portion of the plurality of reception circuits.

7. An equalizer adapter for adapting waveform shaping of data signals,
- wherein the equalizer adapter is arranged in correspondence with all or every predetermined number of ones of the plurality of reception circuits each of which receives a data signal through a transmission line, and includes an equalizer having a function of performing waveform shaping of the data signal;
- wherein the equalizer adapter calculates equalization coefficients for the equalizer in each of the plurality of reception circuits based on data from each of the plurality of reception circuit; and
- wherein a difference between a first time at which each of the plurality of reception circuits outputs the data and a second time at which the equalizer adapter receives data is absorbed.

8. The data receiver according to claim 1, wherein the a timing absorption unit including a plurality of timing absorption circuits, each of the plurality of timing absorption circuits is arranged for each of the plurality of reception circuits.

9. The data receiver according to claim 8, wherein each of the plurality of the timing absorption circuit receives a corresponding start signal for enabling each of the plurality of the timing absorption circuit.

10. The data receiver according to claim 1, wherein each of the plurality of the timing absorption circuit reads the data from the corresponding reception circuit until a number of data elements of the data reaches a corresponding threshold number.

11. The data receiver according to claim 3, wherein the equalizer adapter outputs an enable signal to the timing absorption unit, the enable signal allowing the timing absorption unit to output the data to the equalizer adapter.

12. A data receiver, comprising:
- a plurality of reception circuits, each of which receives a data signal and shapes waveform of the data signal based on a equalization coefficient;
- an equalizer adapter, which is arranged for more than one reception circuit among the plurality of reception circuits and calculates the equalization coefficients for the more than one reception circuit based on data from the more that one reception circuit; and
- a synchronization unit which synchronize timings at which the more than one reception circuit outputs the data to the equalizer adapter.

* * * * *